(12) United States Patent
Yoo et al.

(10) Patent No.: US 10,631,013 B2
(45) Date of Patent: Apr. 21, 2020

(54) METHOD FOR RE-POSITIONING SIGNIFICANT COEFFICIENT IN IMAGE ENCODING/DECODING PROCESS AND DEVICE THEREFOR

(71) Applicant: LG ELECTRONICS INC., Seoul (KR)

(72) Inventors: Sunmi Yoo, Seoul (KR); Jin Heo, Seoul (KR); Junghak Nam, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 191 days.

(21) Appl. No.: 15/735,450

(22) PCT Filed: Jun. 13, 2016

(86) PCT No.: PCT/KR2016/006242
§ 371 (c)(1),
(2) Date: Dec. 11, 2017

(87) PCT Pub. No.: WO2016/200234
PCT Pub. Date: Dec. 15, 2016

(65) Prior Publication Data
US 2018/0184131 A1 Jun. 28, 2018

Related U.S. Application Data

(60) Provisional application No. 62/173,975, filed on Jun. 11, 2015.

(51) Int. Cl.
*H04N 19/91* (2014.01)
*H04N 19/48* (2014.01)
(Continued)

(52) U.S. Cl.
CPC .......... *H04N 19/91* (2014.11); *H04N 19/124* (2014.11); *H04N 19/159* (2014.11);
(Continued)

(58) Field of Classification Search
CPC .............................. H04N 19/48; H04N 19/91
See application file for complete search history.

(56) References Cited

U.S. PATENT DOCUMENTS

2009/0028239 A1* 1/2009 Schuur ................ H04N 19/176
375/240.03
2013/0128985 A1 5/2013 He et al.
(Continued)

FOREIGN PATENT DOCUMENTS

KR 10-2015-0032646 A 3/2015

OTHER PUBLICATIONS

Jeong, Deok Yeong et al., "Implementation of CAVLC Encoder for the Image Compression in H.264/AVC", The Journal of the Korea Institute of Information and Communication Engineering. vol. 9, No. 7, Nov. 2015, pp. 1485-1490.

*Primary Examiner* — Francis Geroleo
*Assistant Examiner* — Christopher Glover
(74) *Attorney, Agent, or Firm* — Birch, Stewart, Kolasch & Birch, LLP

(57) ABSTRACT

The present invention provides methods and devices for re-positioning significant coefficient in image encoding/decoding process. A method according to an embodiment of the present invention comprises relocating the non-zero coefficient of the first coefficient group to a preceding coefficient group of the last coefficient group according to the inverse-scanning order based on a number of non-zero coefficients of the last coefficient group and a number of zero coefficients at positions starting from the last non-zero coefficients within the preceding coefficient group, thereby an amount of residual signals may be saved.

6 Claims, 13 Drawing Sheets

(51) Int. Cl.
*H04N 19/159* (2014.01)
*H04N 19/176* (2014.01)
*H04N 19/44* (2014.01)
*H04N 19/124* (2014.01)

(52) U.S. Cl.
CPC ........... *H04N 19/176* (2014.11); *H04N 19/44* (2014.11); *H04N 19/48* (2014.11)

(56) References Cited

U.S. PATENT DOCUMENTS

2014/0307777 A1  10/2014  Sole Rojals et al.
2015/0078432 A1*  3/2015  Wang .................. H04N 19/159
                                                    375/240.02

\* cited by examiner

METHOD FOR RE-POSITIONING SIGNIFICANT COEFFICIENT IN IMAGE ENCODING/DECODING PROCESS AND DEVICE THEREFOR

CROSS-REFERENCE TO RELATED APPLICATIONS

This application is the National Phase of PCT International Application No. PCT/KR2016/006242, filed on Jun. 13, 2016, which claims priority under 35 U.S.C. 119(e) to U.S. Provisional Application No. 62/173,975, filed on Jun. 11, 2015, all of which are hereby expressly incorporated by reference into the present application.

TECHNICAL FIELD

The present invention relates to a method for processing still image or video and, more particularly, to a method for encoding/decoding a transformed residual signal and a device supporting the same.

BACKGROUND ART

A compression encoding means a series of signal processing techniques for transmitting digitized information through a communication line or techniques for storing the information in a form that is proper for a storage medium. The media including a picture, an image, an audio, and the like may be the target for the compression encoding, and particularly, the technique of performing the compression encoding targeted to the picture is referred to as a video image compression.

The next generation video contents are supposed to have the characteristics of high spatial resolution, high frame rate and high dimensionality of scene representation. In order to process such contents, drastic increase of memory storage, memory access rate and processing power will be resulted.

Accordingly, it is required to design the coding tool for processing the next generation video contents efficiently.

DISCLOSURE

Technical Problem

An aspect of the present invention provides a method for encoding/decoding a transformed residual signal.

Another aspect of the present invention provides a method for dividing a residual signal-transformed block into small subblocks and distinguishing the subblocks as significant coefficient regions.

Another aspect of the present invention provides a method for encoding/decoding a significant coefficient.

Another aspect of the present invention provides a method for re-positioning a significant coefficient and encoding/decoding in units of predetermined subblocks.

The objects of the present invention are not limited to the technical objects described above, and other technical that are objects not mentioned herein may be understood to those skilled in the art from the description below.

Technical Solution

According to an aspect of the present invention, there is provided a method for encoding an image by an encoding device, including: dividing a quantized coefficient block into coefficient groups (CGs) having a predetermined size; searching a first coefficient group which is a last coefficient group including a non-zero coefficient within the quantized coefficient block according to a predetermined inverse-scanning order, searching a last non-zero coefficient within the quantized coefficient block according to the inverse-scanning order; re-positioning the non-zero coefficient of the first CG to a second CG as a preceding CG of the final CG according to the inverse-scanning order; and performing entropy-encoding by an encoder according to a predetermined scanning order.

According to another aspect of the present invention, there is provided an encoding device for encoding an image, including: a coefficient group (CG) dividing unit dividing a quantized coefficient block into CGs having a predetermined size; a scanning unit searching a first CG which is a last CG including a non-zero coefficient within the quantized coefficient block according to a predetermined inverse-scanning order and searching a last non-zero coefficient according to the inverse-scanning order within the first CG; a coefficient re-positioning unit re-positioning the non-zero coefficient of the first CG to a second CG as a preceding CG of the last CG according to the inverse-scanning order, and an entropy-encoding unit performing entropy-encoding according to a predetermined scanning order.

Preferably, the number of non-zero coefficients within the first CG and a zero coefficient within the second CG may be counted, and when the number of non-zero coefficients within the first CG is smaller than the zero coefficient within the second CG, the non-zero coefficient of the first CG may be re-positioned to the second CG.

Preferably, a last non-zero coefficient may be searched according to the inverse-scanning order from within the second CG, and the non-zero coefficient within the first CG may be re-positioned next to the last non-zero coefficient within the second CG according to the inverse-scanning order.

According to another aspect of the present invention, there is provided a method for decoding an image by a decoding device, including: deriving a quantized transform coefficient by entropy-decoding a bit stream output from an encoder, positioning the quantized transform coefficient according to a predetermined scanning order; re-positioning a moved quantized transform coefficient within a block of the quantized transform coefficient to its original position; and inverse-quantizing the re-positioned quantized transform coefficient to derive a transform coefficient.

According to another aspect of the present invention, there is provided a decoding device for decoding an image, including: an entropy-decoding unit entropy-decoding a bit stream output from an encoder to derive a quantized transform coefficient; a scanning unit positioning the quantized transform coefficient according to a predetermined scanning order; a coefficient re-positioning unit re-positioning a moved quantized transform coefficient within a block of the quantized transform coefficient to its original position; and an inverse-quantization performing unit inverse-quantizing the re-positioned quantized transform coefficient to derive a transform coefficient.

Preferably, number information of the moved quantized transform coefficient may be parsed from the bit stream.

Preferably, a second CG as a last CG including a non-zero coefficient may be searched according to a predetermined inverse-scanning order from within the block of the quantized transform coefficient.

Preferably, a last non-zero coefficient may be searched according to the inverse-scanning order from within the second CG.

Preferably, a coefficient positioned before the number indicated by the number information from the last non-zero coefficient −1 to the last non-zero coefficient may be re-positioned within the second CG according to the inverse-scanning order.

Preferably, the moved quantized transform coefficient may be re-positioned to a first CG as a next CG of the second CG according to the inverse-scanning order.

Preferably, the moved quantized transform coefficient may be sequentially re-positioned, starting from a first coefficient position of the first CG according to the inverse-scanning order.

Preferably, information indicating whether a position of the quantized transform coefficient has been moved may be parsed from the bit stream, and when the information indicates that the position of the quantized transform coefficient has been moved, the position of the moved quantized transform coefficient may be re-positioned to its original position.

Advantageous Effects

According to embodiments of the present invention, an amount of residual signals may be saved when a still image or video is encoded.

According to embodiments of the present invention, encoding/decoding efficiency may be enhanced by saving an amount of residual signals.

The technical effects of the present invention are not limited to the technical effects described above, and other technical effects not mentioned herein may be understood to those skilled in the art from the description below.

DESCRIPTION OF DRAWINGS

The accompanying drawings, which are included herein as a part of the description for help understanding the present invention, provide embodiments of the present invention, and describe the technical features of the present invention with the description below.

BEST MODES

Figure 1:
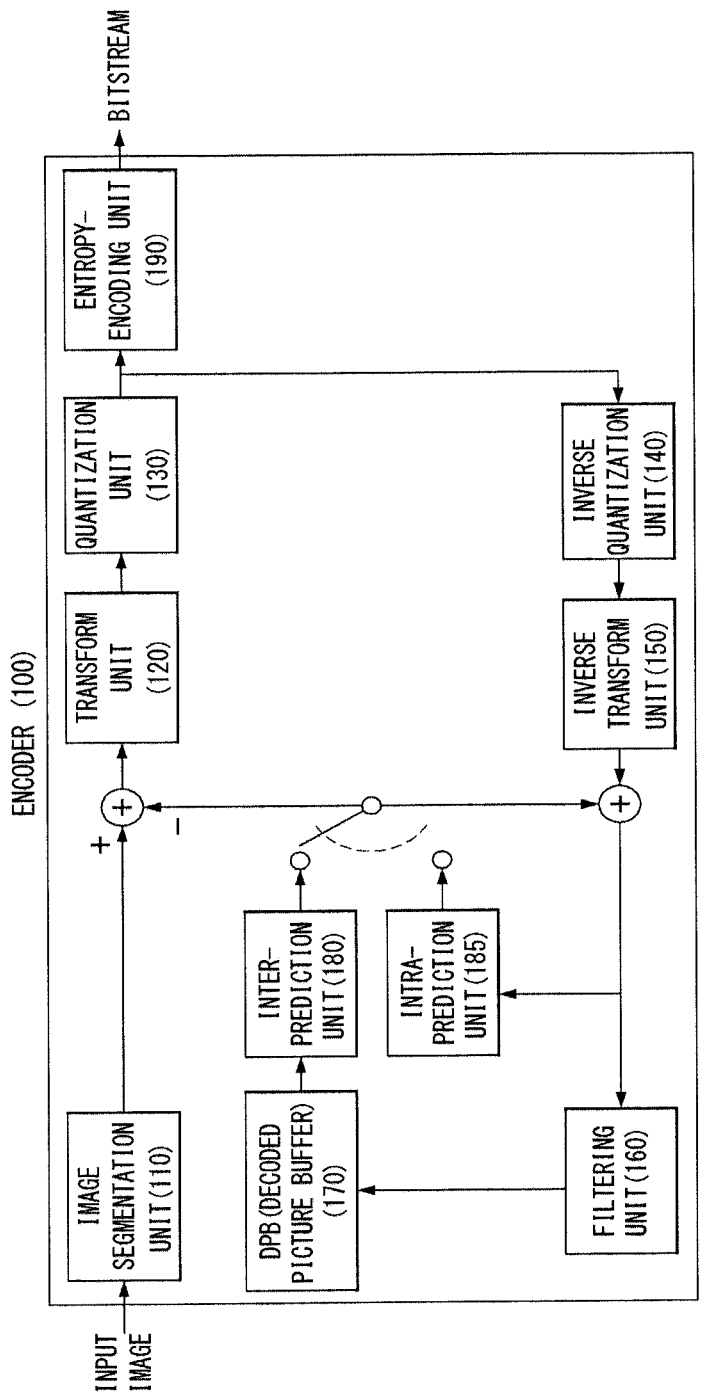
FIG. 1 is a schematic block diagram of an encoder encoding a still image or a video signal according to an embodiment to which the present invention is applied.

Hereinafter, a preferred embodiment of the present invention will be described by reference to the accompanying drawings. The description that will be described below with the accompanying drawings is to describe exemplary embodiments of the present invention, and is not intended to describe the only embodiment in which the present invention may be implemented. The description below includes particular details in order to provide perfect understanding of the present invention. However, it is understood that the present invention may be embodied without the particular details to those skilled in the art.

In some cases, in order to prevent the technical concept of the present invention from being unclear, structures or devices which are publicly known may be omitted, or may be depicted as a block diagram centering on the core functions of the structures or the devices.

Further, although general terms widely used currently are selected as the terms in the present invention as much as possible, a term that is arbitrarily selected by the applicant is used in a specific case. Since the meaning of the term will be clearly described in the corresponding part of the description in such a case, it is understood that the present invention will not be simply interpreted by the terms only used in the description of the present invention, but the meaning of the terms should be figured out.

Specific terminologies used in the description below may be provided to help the understanding of the present invention. And, the specific terminology may be modified into other forms within the scope of the technical concept of the present invention. For example, a signal, data, a sample, a picture, a frame, a block, etc may be properly replaced and interpreted in each coding process.

Hereinafter, in the present disclosure, 'block' or 'unit' refers to a unit on which a process of encoding/decoding such as prediction, transform, and/or quantization is performed, and may be configured as a multi-dimensional array of a sample (or picture element or pixel).

'Block' or 'unit' may refer to a multi-dimensional array of samples regarding a luma component or a multi-dimensional array of samples regarding a chroma component. Also, both the multi-dimensional array regarding the luma component and the multi-dimensional array regarding the chroma component may be generally called 'block' or 'unit'.

For example, 'block' or 'unit' may be interpreted as having a meaning including all of a coding block (CB) which refers to an array of samples to be encoded/decoded, a coding tree block (CTB) including a plurality of coding blocks, a prediction block (PB) (or a prediction unit (PU)) which refers to an array of samples to which the same prediction is applied, and a transform block (TB) (or a transform unit (TU)) which refer to an array of samples to which the same transform is applied.

Also, in this disclosure, unless otherwise mentioned, 'block' or 'unit' may be interpreted to have a meaning including a syntax structure used in the process of encoding/decoding an array of samples regarding a luma component and/or chroma component. Here, the syntax structure refers to zero or more of syntax elements present within a bit stream in a specific order, and the syntax element refers to an element of data expressed within a bit stream.

For example, 'block' or 'unit' may be interpreted as having a meaning including all of a coding unit (CU) including a coding block (CB) and a syntax structure used for encoding the corresponding coding block, a coding tree unit (CTU) including a plurality of coding units, a prediction unit (PU) including a prediction block (PB) and a syntax structure used for predicting the corresponding prediction block (PB), a transform unit (TU) including a transform block (TB) and a syntax structure used for transforming the corresponding transform block (TB).

Also, in this disclosure, 'block' or 'unit' is not limited to an array of square or rectangular samples (or picture elements or pixels) and may refer to an array of samples (or picture elements or pixels) having a polygonal shape with three or more vertices. In this case, 'block' or 'unit' may be called a polygon block or polygon unit.

FIG. 1 is a schematic block diagram of an encoder encoding a still image or video according to an embodiment to which the present invention is applied.

Referring to FIG. 1, an encoder 100 may include a picture partitioning unit 110, a subtract unit 115, a transform unit 120, a quantization unit 130, an inverse-quantization unit 140, an inverse-transform unit 150, a filtering unit 160, a decoded picture buffer (DPB) 170, a prediction unit and an entropy encoding unit 190. And the prediction unit may include an inter-prediction unit 180 and an intra-prediction unit 185.

The picture partitioning unit 110 may segment an input video signal (or picture or frame) input to the encoder 100 into one or more blocks.

The subtract unit 115 may subtract a predicted signal (or predicted block) output from the prediction unit (i.e., the inter-prediction unit 180 or the intra-prediction unit 185), from the input video signal to generate a residual signal (or a residual block). The generated residual signal (or residual block) is transmitted to the transform unit 120.

The transform unit 120 applies a transform method (e.g., discrete cosine transform (DCT), discrete sine transform (DST), graph-based transform (GBT), Karhunen-Loeve transform (KLT), etc.) to generate a transform coefficient. Here, the transform unit 120 may perform transformation using a transform method determined according to a prediction mode applied to the residual block and a size of the residual block to generate transform coefficients.

The quantization unit 130 quantizes the transform coefficient and transmits it to the entropy encoding unit 190, and the entropy encoding unit 190 performs an entropy coding operation of the quantized signal and outputs it as a bit stream.

Meanwhile, the quantized signal that is outputted from the quantization unit 130 may be used for generating a prediction signal. For example, by applying dequantization and inverse transformation to the quantized signal through the inverse-quantization unit 140 and the inverse-transform unit 150, the residual signal may be reconstructed. By adding the reconstructed residual signal to the prediction signal that is outputted from the inter-prediction unit 180 or the intra-prediction unit 185, a reconstructed signal or a reconstructed block may be generated.

On the other hand, during such a compression process, adjacent blocks are quantized by different quantization parameters from each other, and accordingly, an artifact in which block boundaries are shown may occur. Such a phenomenon is referred to blocking artifact, which is one of the important factors for evaluating image quality. In order to decrease such an artifact, a filtering process may be performed. Through such a filtering process, the blocking artifact is removed and the error for the current picture is decreased at the same time, thereby the image quality being improved.

The filtering unit 160 applies filtering to the reconstructed signal, and outputs it through a play-back device or transmits it to the decoded picture buffer 170. The filtered signal transmitted to the decoded picture buffer 170 may be used as a reference picture in the inter-prediction unit 180. As such, by using the filtered picture as a reference picture in an inter-picture prediction mode, the encoding rate as well as the image quality may be improved.

The decoded picture buffer 170 may store the filtered picture in order to use it as a reference picture in the inter-prediction unit 180

The inter-prediction unit 180 performs a temporal prediction and/or a spatial prediction by referencing the reconstructed picture in order to remove a temporal redundancy and/or a spatial redundancy.

Here, since the reference picture used for performing a prediction is a transformed signal that goes through the quantization or the inverse-quantization by a unit of block when being encoded/decoded previously, there may exist blocking artifact or ringing artifact Accordingly, in order to solve the performance degradation owing to the discontinuity of such a signal or the quantization, by applying a low pass filter to the inter-prediction unit 180, the signals between pixels may be interpolated by a unit of sub-pixel. Herein, the sub-pixel means a virtual pixel that is generated by applying an interpolation filter, and an integer pixel means an actual pixel that is existed in the reconstructed picture. As a method of interpolation, a linear interpolation, a bi-linear interpolation, a wiener filter, and the like may be applied.

The interpolation filter may be applied to the reconstructed picture, and may improve the accuracy of prediction. For example, the inter-prediction unit 180 may perform prediction by generating an interpolation pixel by applying the interpolation filter to the integer pixel, and by using the interpolated block that includes interpolated pixels.

The intra-prediction unit 185 predicts a current block with reference to samples around a block to be currently encoded. The intra-prediction unit 185 may perform the following process to perform intra-prediction. First, the intra-prediction unit 185 may prepare a reference sample required for generating a predicted signal. Also, the intra-prediction unit 185 may generate a predicted signal (predicted block) using the prepared reference sample. Thereafter, a prediction mode is encoded. Here, the reference sample may be prepared through reference sample padding and/or reference sample filtering. Since the reference sample has undergone a prediction and reconstructing process, it may have a quantization error. Thus, in order to reduce such an error, a reference sample filtering process may be performed on each prediction mode used for intra-prediction.

The predicted signal (or predicted block) generated through the inter-prediction unit 180 or the intra-prediction unit 185 may be used to generate a reconstructed signal (or reconstructed block) or a residual signal (or residual block).

Figure 2:
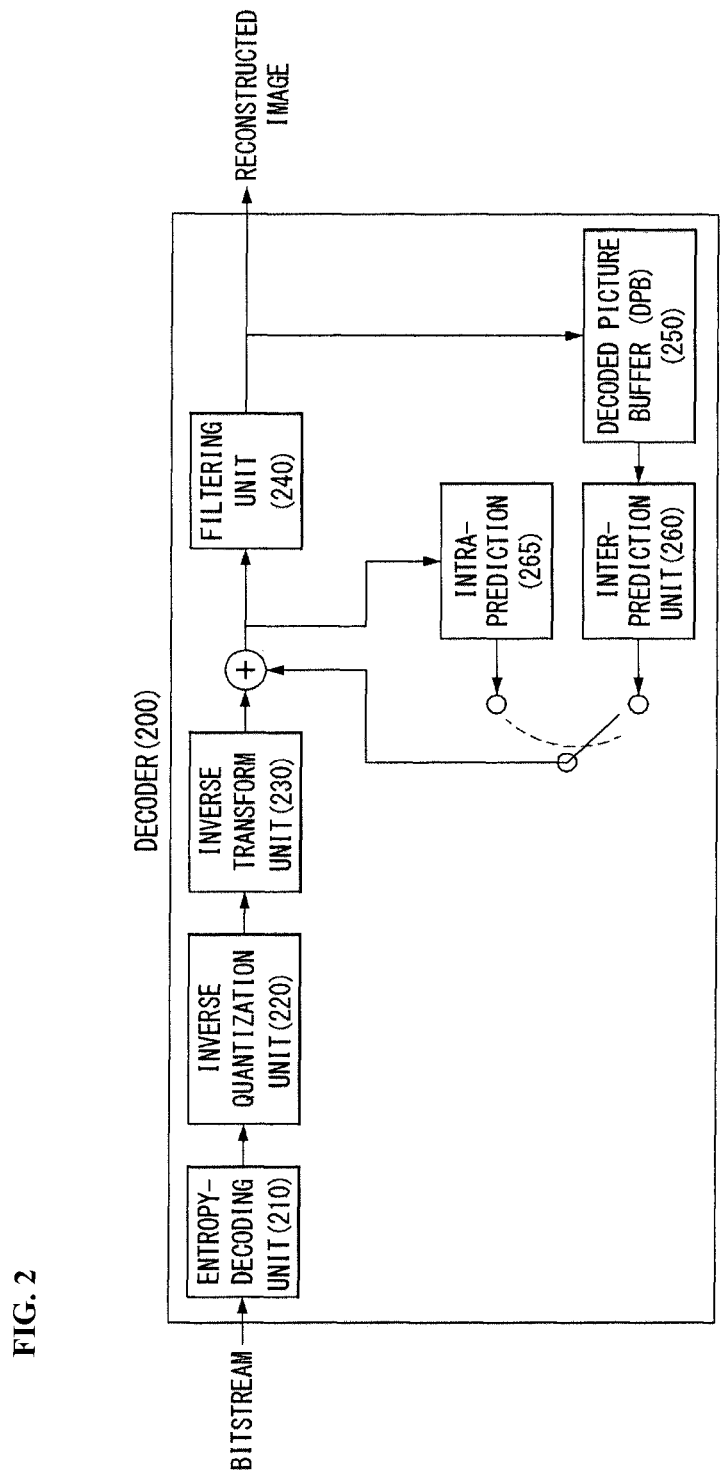
FIG. 2 is a schematic block diagram of a decoder decoding a still image or a video signal according to an embodiment to which the present invention is applied.

FIG. 2 is a schematic block diagram of a decoder decoding a still image or a video signal according to an embodiment to which the present invention is applied.

Referring to FIG. 2, a decoder 200 may include an entropy decoding unit 210, an inverse-quantization unit 220, an inverse-transform unit 230, an add unit 235, a filtering unit 240, a decoded picture buffer (DPB) 250 and a prediction unit. And the prediction unit may include an inter-prediction unit 260 and an intra-prediction unit 265.

And, the reconstructed video signal outputted through the decoder 200 may be played through a play-back device.

The decoder 200 receives the signal (i.e., bit stream) outputted from the encoder 100 shown in FIG. 1, and the entropy decoding unit 210 performs an entropy decoding operation of the received signal.

The inverse-quantization unit 220 acquires a transform coefficient from the entropy-decoded signal using quantization step size information.

The inverse-transform unit 230 inverse-transforms the transform coefficient by applying an inverse-transform technique to obtain a residual signal (or residual block).

The add unit 235 adds the obtained residual signal (or residual block) to the predicted signal (or predicted block) output from the inter-prediction unit 260 or the intra-prediction unit 265 to generate a reconstructed signal (or reconstructed block).

The filtering unit 240 applies filtering to the reconstructed signal (or reconstructed block) and outputs the filtered signal to a reproducing device (or player) or transmits the same to the DPB 250. The filtered signal transmitted to the DPB 250 may be used as reference picture in the inter-prediction unit 260.

In this specification, the embodiments described in the filtering unit 160, the inter-prediction unit 180 and the intra-prediction unit 185 of the encoder 100 may also be applied to the filtering unit 240, the inter-prediction unit 260 and the intra-prediction unit 265 of the decoder, respectively, in the same way.

Block Dividing Structure

Generally, the block-based image compression method is used in the compression technique (e.g., HEVC) of a still image or a video. The block-based image compression method is a method of processing an image by partitioning it into a specific block unit, and may decrease the use of memory and the amount of operation.

Figure 3:
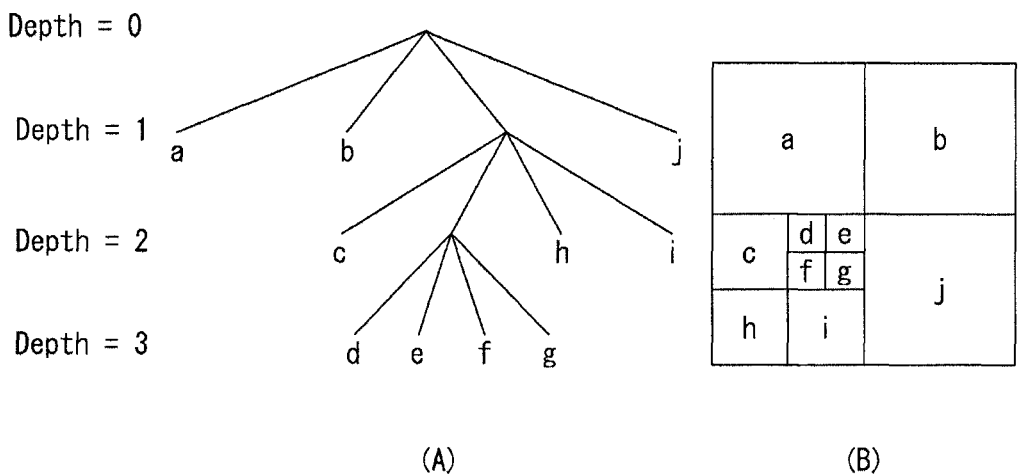
FIG. 3 is a view illustrating a structure of dividing a coding unit which may be applied to the present invention.

FIG. 3 is a diagram for describing a partition structure of a coding unit that may be applied to the present invention.

An encoder partitions a single image (or picture) in a coding tree unit (CTU) of a rectangle shape, and encodes the CTU sequentially one by one according to a raster scan order.

In the HEVC, a size of CTU may be determined by one of 64×64, 32×32 and 16×16. The encoder may select and use the size of CTU according to the resolution of input image or the characteristics of input image. The CTU includes a coding tree block (CTB) for a luma component and the CTB for two chroma components that correspond to it.

One CTU may be partitioned into a quad tree structure. That is, one CTU may be partitioned into four units each having a square shape and having a half horizontal size and a half vertical size, generating coding units (CUs). Dividing the quad tree structure may be recursively performed. That is, a CU is hierarchically segmented to a quad tree structure from one CTU.

The CU refers to a basic unit in processing an input image, for example, coding of performing intra/inter-prediction. The CU includes a coding block (CB) regarding a luma component and a CB regarding two chroma components corresponding thereto. In HEVC, a size of the CU may be determined to any one of 64×64, 32×32, 16×16, and 8×8.

Referring to FIG. 3, a root node of a quad-tree relates to a CTU. The quad tree is partitioned until it reaches a leaf node, and the leaf node corresponds to a CU.

In detail, a CTU corresponds to a root node and has a smallest depth value (i.e., depth=0). The CTU may not be partitioned depending on characteristics of an input image, and in this case, the CTU corresponds to a CU.

The CTU may be partitioned into a quad tree form, and as a result, lower nodes having a depth of 1 (depth=1) are generated. A node (i.e., a leaf node) which is not partitioned any further from the lower node having a depth of 1 corresponds to a CU. For example, in FIG. 3(b), CU(a), CU(b), and CU(j) have been once partitioned from a CTU and have a depth of 1.

At least any one of the nodes having the depth of 1 may be partitioned into a quad tree form again, and as a result, lower nodes having a depth of 2 (i.e., depth=2) are generated. Also, a node (i.e., leaf node) which cannot be partitioned into any further from the lower node having a depth of 2 corresponds to a CU. For example, in FIG. 3(b), CU(c), CU(h), and CU(i) corresponding to nodes c, h, and i have been partitioned twice and have a depth of 2.

Also, at least any one of the nodes having the depth of 2 may be partitioned again into a quad tree form, and as a result, lower nodes having a depth of 3 (i.e., depth=3) are generated. Also, a node (i.e., leaf node) which cannot be divided any further from the lower node having the depth of 3 corresponds to a CU. For example, in FIG. 3(b), CU(d), CU(e), CU(f), and CU(g) corresponding to d, e, f, and g have been partitioned three times from the CTU and have a depth of 3.

In an encoder, the maximum size or the minimum size of a CU may be determined according to the characteristics of a video image (e.g., resolution) or by considering encoding rate. And, the information for this or the information that may derive this may be included in a bit stream. The CU that has the maximum size is referred to as a largest coding unit (LCU), and the CU that has the minimum size is referred to as a smallest coding unit (SCU).

In addition, the CU that has a tree structure may be hierarchically partitioned with predetermined maximum depth information (or maximum level information). And, each partitioned CU may have the depth information. Since the depth information represents a partitioned count and/or degree of a CU, the depth information may include the information of a size of CU.

Since the LCU is partitioned in a Quad-tree shape, the size of SCU may be obtained by using a size of LCU and the maximum depth information. Or, inversely, the size of LCU may be obtained by using a size of SCU and the maximum depth information of the tree.

For a single CU, the information (e.g., a partition CU flag (split_cu_flag)) that represents whether the corresponding CU is partitioned may be forwarded to a decoder. This partition information is included in all CUs except the SCU. For example, when the value of the flag that represents whether to partition is '1', the corresponding CU is further partitioned into four CUs, and when the value of the flag that represents whether to partition is '0', the corresponding CU is not partitioned any more, and the processing process for the corresponding CU may be performed.

As described above, the CU is a basic unit of the coding in which the intra-prediction or the inter-prediction is performed. The HEVC partitions the CU in a prediction unit (PU) for coding an input image more effectively.

The PU is a basic unit for generating a prediction block, and even in a single CU, the prediction block may be generated in different way by a unit of PU. However, the intra-prediction and the inter-prediction are not used together for the PUs that belong to a single CU, and the PUs that belong to a single CU are coded by the same prediction method (i.e., the intra-prediction or the inter-prediction).

The PU is not partitioned in the Quad-tree structure, but is partitioned once in a single CU in a predetermined shape. This will be described by reference to the drawing below.

Figure 4:
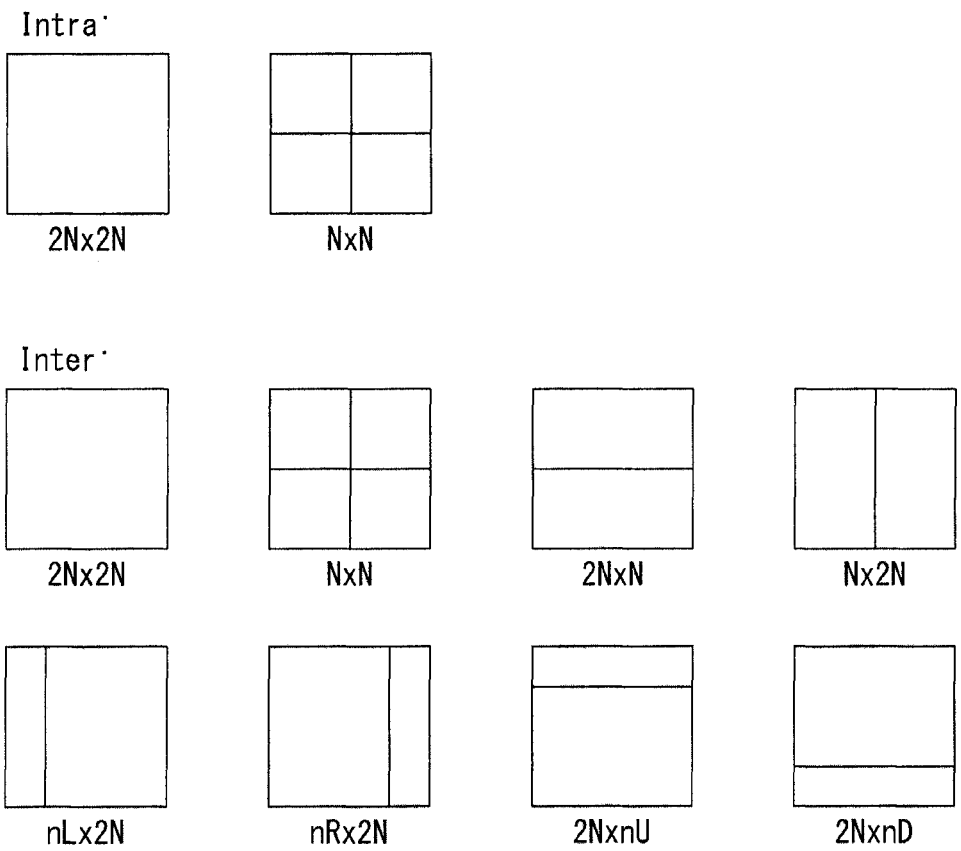
FIG. 4 is a view illustrating a prediction unit which may be applied to the present invention.

FIG. 4 is a diagram for describing a prediction unit that may be applied to the present invention.

A PU is differently partitioned depending on whether the intra-prediction mode is used or the inter-prediction mode is used as the coding mode of the CU to which the PU belongs.

FIG. 4 illustrates a PU of the case that the intra-prediction mode and the inter-prediction mode is used.

Referring to upper part (Intra) of FIG. 4, assuming the case that the size of a single CU is 2N×2N (N=4, 8, 16 and 32), a single CU may be partitioned into two types (i.e., 2N×2N or N×N).

Here, in the case that a single CU is partitioned into the PU of 2N×2N shape, it means that only one PU is existed in a single CU.

On the other hand, in the case that a single CU is partitioned into the PU of N×N shape, a single CU is partitioned into four PUs, and different prediction blocks are generated for each PU unit. However, such a PU partition may be performed only in the case that the size of CB for the luma component of CU is the minimum size (i.e., the case that a CU is an SCU).

Referring to lower part (Inter) of FIG. 4, assuming the case that the size of a single CU is 2N×2N (N=4, 8, 16 and 32), a single CU may be partitioned into eight PU types (i.e., 2N×2N, N×N, 2N×N, N×2N, nL×2N, nR×2N, 2N×nU and 2N×nD.

Similar to the intra-prediction, the PU partition of N×N shape may be performed only in the case that the size of CB for the luma component of CU is the minimum size (i.e., the case that a CU is an SCU).

The inter-prediction supports the PU partition in the shape of 2N×N that is partitioned in a horizontal direction and in the shape of N×2N that is partitioned in a vertical direction.

In addition, the inter-prediction supports the PU partition in the shape of nL×2N, nR×2N, 2N×nU and 2N×nD, which is an asymmetric motion partition (AMP). Here, 'n' means ¼ value of 2N. However, the AMP may not be used in the case that the CU to which the PU is belonged is the CU of minimum size.

In order to encode the input image in a single CTU efficiently, the optimal partition structure of the coding unit (CU), the prediction unit (PU) and the transform unit (TU) may be determined based on a minimum rate-distortion value through the processing process as follows. For example, as for the optimal CU partition process in a 64×64 CTU, the rate-distortion cost may be calculated through the partition process from the CU of 64×64 size to the CU of 8×8 size. The detailed process is as follows.

1) The optimal partition structure of PU and TU that generates the minimum rate distortion value is determined through performing the inter/intra-prediction, the transformation/quantization, the inverse-quantization/inverse transformation and the entropy encoding for the CU of 64×64 size.

2) The optimal partition structure of PU and TU is determined to partition the 64×64 CU into four CUs of 32×32 size and to generate the minimum rate distortion value for each 32×32 CU.

3) The optimal partition structure of PU and TU is determined to further partition the 32×32 CU into four CUs of 16×16 size and to generate the minimum rate distortion value for each 16×16 CU.

4) The optimal partition structure of PU and TU is determined to further partition the 16×16 CU into four CUs of 8×8 size and to generate the minimum rate distortion value for each 8×8 CU.

5) The optimal partition structure of CU in the 16×16 block is determined by comparing the rate-distortion value of the 16×16 CU that is obtained in the process of 3) above with the addition of the rate-distortion value of the four 8×8 CUs that is obtained in the process of 4) above. This process is also performed for remaining three 16×16 CUs in the same manner.

6) The optimal partition structure of CU in the 32×32 block is determined by comparing the rate-distortion value of the 32×32 CU that is obtained in the process of 2) above with the addition of the rate-distortion value of the four 16×16 CUs that is obtained in the process of 5) above. This process is also performed for remaining three 32×32 CUs in the same manner.

7) Lastly, the optimal partition structure of CU in the 64×64 block is determined by comparing the rate-distortion value of the 64×64 CU that is obtained in the process of 1) above with the addition of the rate-distortion value of the four 32×32 CUs that is obtained in the process of 6) above.

In the intra-prediction mode, a prediction mode is selected in units of PU, and prediction and reconstruction are performed on the selected prediction mode in actual units of TU.

The TU refers to a basic unit by which actual prediction and reconstruction are carried out. The TU includes a transform block (TB) regarding a luma component and a TB regarding two chroma components corresponding thereto.

In the foregoing example of FIG. 3, like one CTU is partitioned into a QT structure to generate CUs, a TU is hierarchically partitioned into a QT structure from one CU.

Since the TU is partitioned to a QT structure, the TU partitioned from a CU may be partitioned into smaller TUs again. In HEVC, a size of a TU may be determined to any one of 32×32, 16×16, 8×8, and 4×4.

Referring back to FIG. 3, it is assumed that a root node of a QT is related to a CU. A QT is partitioned until it reaches a leaf node, and the leaf node corresponds to a TU.

In detail, a CU corresponds to a root node and has a smallest depth (i.e., depth=0). The CU may not be partitioned according to characteristics of an input image, and in this case, the CU corresponds to a TU.

The CU may be partitioned to a QT form, and as a result, lower nodes having a depth of 1 (depth=1) are generated. Among the lower nodes having the depth of 1, a node which is not partitioned any further (i.e., a leaf node) corresponds to a TU. For example, in FIG. 3(b), TU(a), TU(b), and TU(j) respectively corresponding to a, b, and j have been once partitioned from a CU and have a depth of 1.

At least any one of nodes having the depth of 1 may also be partitioned to a QT form, and as a result, lower nodes having a depth of 2 (i.e., depth=2) are generated. Among the lower nodes having the depth of 2, a node which is not partitioned any further (i.e., a lead node) corresponds to a TU. For example, in FIG. 3(b), TU(c), TU(h), and TU(i) respectively corresponding to c, h, and I have been partitioned twice from a CU and have the depth of 2.

Also, at least one of nodes having the depth of 2 may be partitioned again to a QT form, and as a result, lower nodes having a depth of 3 (i.e., depth=3) are generated. Among the lower nodes having the depth of 3, a node which is not partitioned any further (i.e., a leaf node) corresponds to a CU. For example, in FIG. 3(b), TU(d), TU(e), TU(f), and TU(g) respectively corresponding to nodes d, e, f, and g have been partitioned three times and have the depth of 3.

The TU having a tree structure may be hierarchically partitioned with predetermined largest depth information (or largest level information). Also, each of the partitioned TUs may have depth information. Since depth information represents the number by which the TU has been partitioned and/or a degree to which the TU has been divided, the depth information may include information regarding a size of the TU.

Regarding one TU, information (e.g., a split TU flag (split_tranform_flag) representing whether the corresponding TU is partitioned may be delivered to the decoder. The split information is included in every TU except for a TU having a smallest size. For example, if the value of the flag representing partition is '1', the corresponding TU is partitioned again into four TUs, while if the flag representing partition is '0', the corresponding CU is not partitioned any further.

Method for Encoding/Decoding Residual Signal

An input image is differentiated with an intra-prediction unit or an inter-prediction unit and may be reconstructed in a decoder by transmitting information regarding prediction and a residual signal regarding a differential. This will be described in detail with reference to the accompanying drawings.

Figure 5:
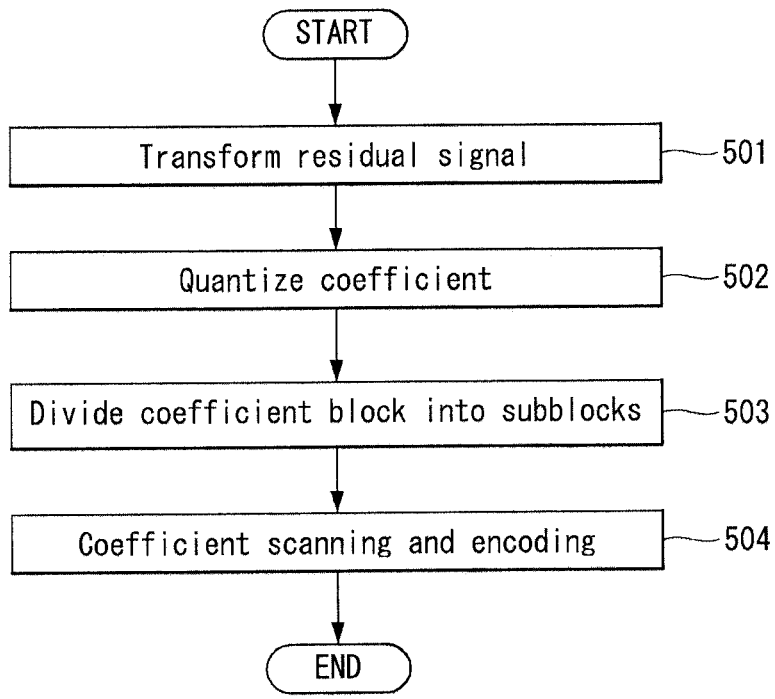
FIG. 5 is a flow chart illustrating a method for encoding a residual signal according to an embodiment to which the present invention may be applied.

FIG. 5 illustrates a method for encoding a residual signal according to an embodiment to which the present invention may be applied.

Referring to FIG. 5, an encoder (encoding device) transforms a residual signal (or a residual block) (S501).

The residual signal refers to a signal differentiated from a signal predicted by an intra-prediction unit or an inter-prediction unit. The residual signal is a signal of a spatial domain, and by transforming the residual signal into a frequency domain, correlation between signals may be removed and energy may be concentrated to a low frequency region.

Here, as described above, the encoder may generate a transform coefficient by applying a transform technique such as DCT, DST, GBT, KLT, and the like.

The encoder quantizes the transform coefficient (S502).

The transformed signal is scaled and/or quantized to reduce a magnitude thereof.

The encoder divides a transform block into subblocks (S503).

The encoder may divide the transform block into subblocks having a predetermined size (e.g., subblocks each having a size of 4×4).

The encoder scans the quantized transform coefficient and encodes the coefficient according to a scan order (S504).

That is, the quantized transform coefficients are entropy-coded and transmitted to a decoder in predetermined order.

Here, the scan order may be an up-right diagonal scan order, a horizontal scan order, a vertical scan order, and the like.

The encoder may perform scanning, starting from a position of a last significant coefficient (i.e., non-zero coefficient), in a reverse direction until it reaches coordinates (0,0) designated as a so-called DC coefficient. Here, the quantized transform coefficients may be scanned according to the up-right diagonal scan order within each subblock, and also, each subblock may be scanned according to the up-right diagonal scan order in the same manner.

Here, information for identifying a position of the last significant coefficient (i.e., a position of column and a position of row) within the transform block may be encoded.

The decoder may obtain a reconstructed image by reversely performing the same process as that performed in the encoder. This will be described in detail with reference to the accompanying drawings.

Figure 6:
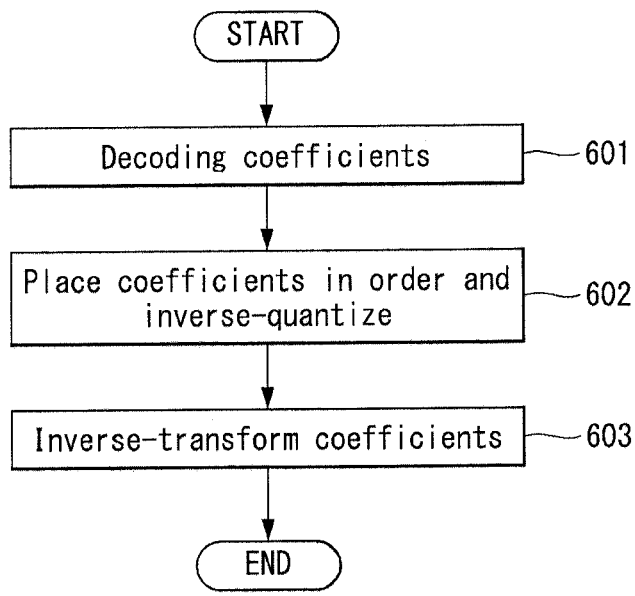
FIG. 6 is a flow chart illustrating a method for decoding a residual signal according to an embodiment to which the present invention may be applied.

FIG. 6 illustrates a method for decoding a residual signal according to an embodiment to which the present invention may be applied.

Referring to FIG. 6, the decoder (or decoding device) decodes a coefficient (S601).

That is, the decoder may entropy-decodes a signal (i.e., bit stream) output from the encoder to obtain a quantized transform coefficient.

The decoder (decoding device) positions the quantized transform coefficient in scan order and inverse-quantizes the same (S602).

That is, the decoder may position each quantized transform coefficient reconstructed through entropy-decoding in a residual signal array according to predetermined order.

As described above, the scan order may be the up-right diagonal scan order, the horizontal scan order, the vertical scan order, and the like.

As described above, information indicating a position of a last significant coefficient (i.e., non-zero coefficient) according to the scan order within the transform block may be signaled in a bit stream. The decoder may parse the foregoing information to derive a position of a column and a position of a row of a last significant coefficient (i.e., non-zero coefficient) according to the scan order within the transform block.

The decoder may perform scanning, starting from a position of a last significant coefficient (i.e., non-zero coefficient), in a reverse direction until it reaches coordinates (0,0) designated as a so-called DC coefficient. Here, the quantized transform coefficients may be scanned according to the up-right diagonal scan order within each subblock, and also, each subblock may be scanned according to the up-right diagonal scan order in the same manner.

The decoder may inverse-quantize the quantized transform coefficient according to the foregoing scan order.

The decoder (decoding device) inverse-transforms the transform coefficient (S603).

That is, the decoder may obtain a residual signal by inverse-transforming the transform coefficient by applying an inverse-transformation technique.

In this manner, each coefficient reconstructed through entropy-decoding is positioned in a residual signal array according to agreed order and may be reconstructed to a residual signal of the spatial domain through inverse-quantization and inverse-transformation. Also, the reconstructed residual signal is added with a prediction signal and output as a reconstructed image through a filtering process.

Figure 7:
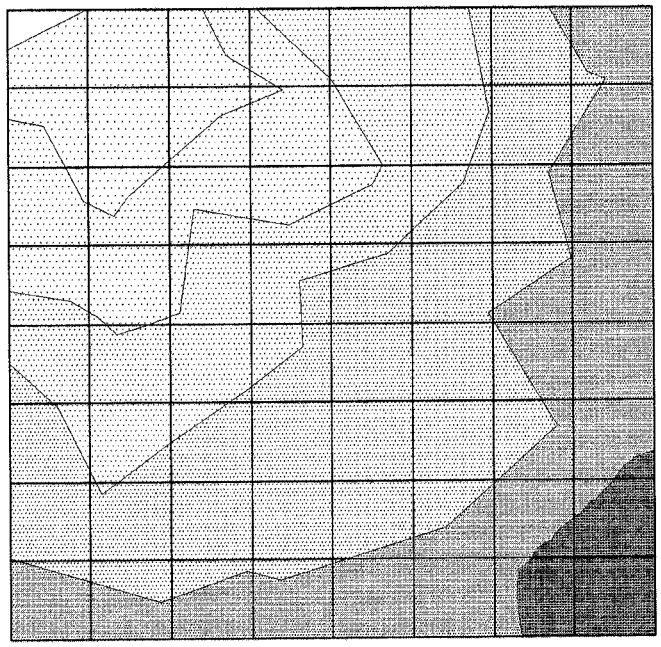
FIG. 7 is a view illustrating a 8×8 transform block according to an embodiment to which the present invention may be applied.

FIG. 7 is a view illustrating a 8×8 transform block according to an embodiment to which the present invention may be applied.

In FIG. 7, a distribution diagram of 8×8 transform coefficients.

When a residual signal of a spatial domain is converted into a frequency domain, a distribution in which high frequency signals are gradually spread on the basis of a low frequency component at a left upper corner is obtained as illustrated in FIG. 7. By quantizing a high frequency signal which is relatively recognized by a human being on the basis of a human visual system (HVS), loss compression may be realized.

In this manner, after quantization, non-zero transform coefficients are entropy-coded according to a predefined scanning order and transmitted to the decoder.

Hereinafter, scanning order will be described with reference to the accompanying drawings.

Figure 8:
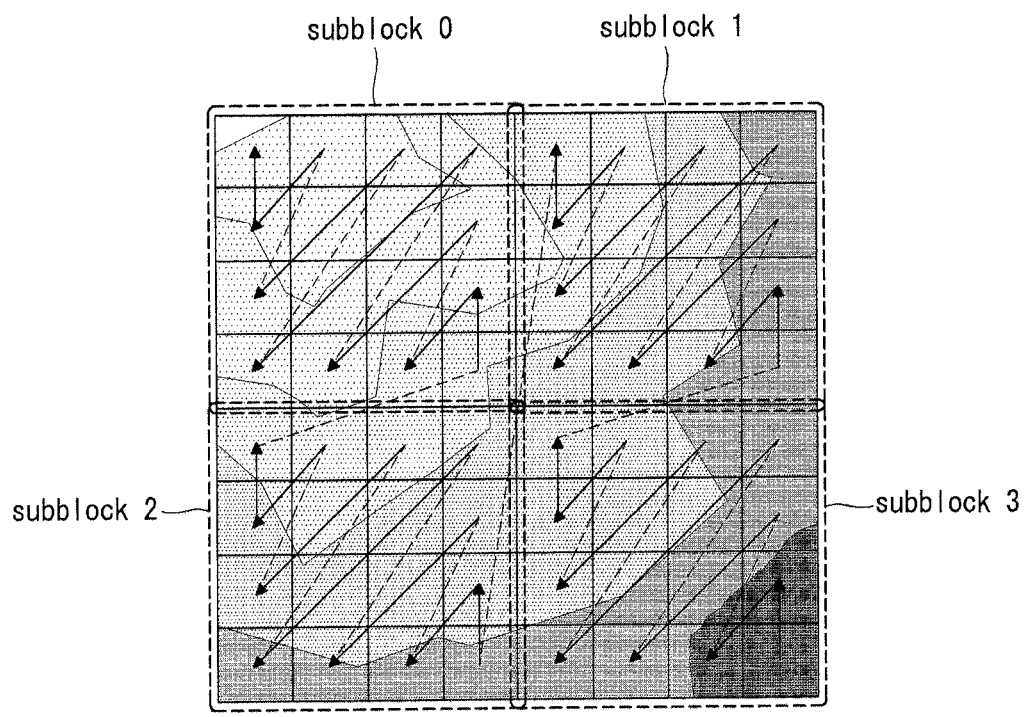
FIG. 8 is a view illustrating dividing a 8×8 transform block into subblocks and scanning order according to an embodiment to which the present invention may be applied.

FIG. 8 is a view illustrating dividing a 8×8 transform block into subblocks and scanning order according to an embodiment to which the present invention may be applied.

In FIG. 8, dividing the 8×8 DCT transform block illustrated in FIG. 7 into subblocks and scanning order are illustrated.

Scanning order of coefficients may be defined on the basis of order illustrated in FIG. 8. This may be termed an up-right diagonal scan order.

Like the direction of arrows of FIG. 8, a scan order may be defined according to a frequency distribution and a last significant coefficient (i.e., a coefficient which is not 0) may be transmitted to the decoder through a bit stream.

As coefficients approach the high frequency region, the coefficients are quantized and mostly do not have a magnitude, and thus, a position before a last significant coefficient (i.e., a preceding position within the scan order) may not be transmitted to the decoder through a bit stream, saving information (or bits).

Also, in order to implement smooth hardware/single instruction multiple data (SIMD) processing, the transformed coefficient block may be divided into a plurality of small subblocks having a specific size. Each subblock may also be scanned and encoded/decoded according to the predefined scan order.

That is, as illustrated in FIG. 8, the quantized transform coefficients within each subblock may be scanned according to the up-right diagonal scan order, and also, each subblock may also be scanned according to the up-right diagonal scan order in the same manner.

Hereinafter, the present invention proposes a method for effectively encoding/decoding an image by saving an amount of residual signals generated when a still image or video is encoded.

That is, an embodiment of the present invention proposes a method for dividing a residual signal-transformed block into subblocks of small units and subsequently distinguishing a significant coefficient region (i.e., a subblock including one or more significant coefficients whose coefficient level is not 0). In detail, an embodiment of the present invention proposes a method for dividing a transform block into subblocks and subsequently determining a significant level of each subblock. Also, an embodiment of the present invention proposes a method for implicitly or explicitly determining the number of significant coefficients within each subblock.

Also, an embodiment of the present invention proposes a method for encoding/decoding a significant coefficient. In detail, an embodiment of the present invention proposes a method for re-positioning a significant coefficient determined within a subblock according to a significant level. Also, an embodiment of the present invention proposes a method for encoding/decoding a coefficient re-positioned according to the significant level by subblocks.

Hereinafter, for the purposes of description, a scan order is assumed to be the up-right diagonal scan order but the present invention is not limited thereto. That is, a predetermined certain scan order (e.g., a horizontal scan order), a vertical scan order, and the like) may also be applied in addition to the up-right diagonal scan order, and an inverse-scan order refers to a reverse order of a scan order.

Also, in the present invention, for the purposes of description, a last subblock/coefficient group before a transform coefficient is re-positioned by the encoder (i.e., a subblock/coefficient group including an actual final non-zero significant coefficient before the transform coefficient is re-positioned) is designated as a first subblock/coefficient group, and a last subblock/coefficient group after the transform coefficient is re-positioned by the encoder (i.e., a subblock/coefficient group including a last non-zero significant coefficient after the transform coefficient is re-positioned) is designated as a second subblock/coefficient group.

In an embodiment of the present invention, a block in which a residual signal has been transformed (i.e., a transform block) is divided into subblocks of smaller units and a significant coefficient region may be distinguished.

1) Distinguishment of Significant Level of Coefficient

An embodiment of the present invention proposes a method for dividing a transformed block into subblocks and determining a significant level of each subblock.

Figure 9:
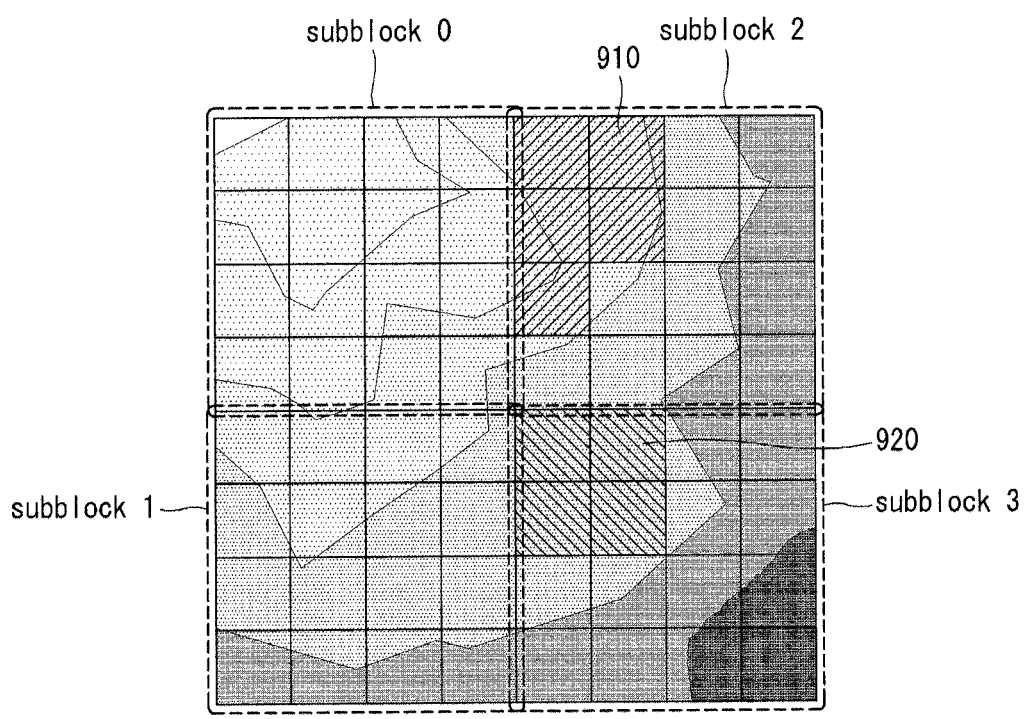
FIG. 9 is a view illustrating a method for determining a significant level within a subblock of a transform block according to an embodiment of the present invention.

FIG. 9 is a view illustrating a method for determining a significant level within a subblock of a transform block according to an embodiment of the present invention.

In FIG. 9, an order of subblocks may be given in order of a top-left subblock, a bottom-left subblock, a top-right subblock and a bottom-right subblock (i.e., a reverse scan order). That is, #0 may indicate the top-left subblock, #1 may indicate the bottom-left subblock, #2 may indicate the top-right subblock, and #3 may indicate the bottom-right subblock.

When it is assumed that a certain transformed block is re-divided into smaller subblocks, the subblocks may also be encoded/decoded sequentially in a scan order.

When the coefficients are scanned in order of bottom-right→top-right→bottom-left→top-left as illustrated in FIG. 8, coefficients 920 in positions indicated by the shade within the bottom-right block (i.e., a subblock 3) and coefficients 910 in positions indicated by the shade within the top-right block (i.e., subblock 2) have low priority although they have coefficient components of a relatively high significant level.

By adjusting the positions of the coefficients, a position of a last significant coefficient may be advanced, and thus, an amount of trailing 0 (i.e., quantized non-significant coefficients) may be reduced.

2) Re-Positioning of Coefficient

Figure 10:
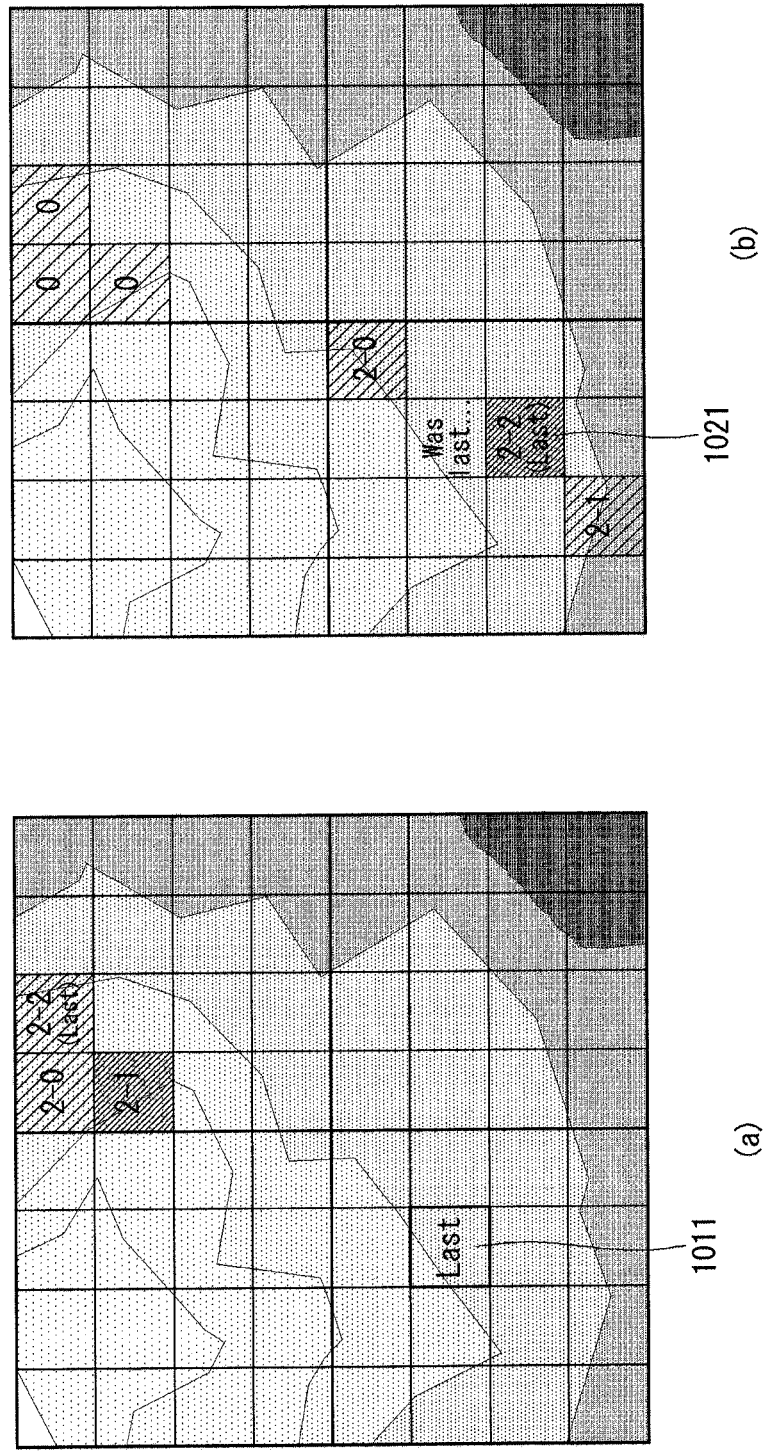
FIG. 10 is a view illustrating a method for re-positioning positions of coefficients according to an embodiment of the present invention.

FIG. 10 is a view illustrating a method for re-positioning positions of coefficients according to an embodiment of the present invention.

As described above, the subblocks are given in order of top-left subblock, the bottom-left subblock, the top-right subblock, and the bottom-right subblock (i.e., a reverse scan order). That is, #0 may indicate the top-left subblock, #1 may indicate the bottom-left subblock, #2 may indicate the top-right subblock, and #3 may indicate the bottom-right subblock.

In FIG. 10(a), it is assumed that coefficients having relatively high coefficient levels (i.e., coefficients 2-0, 2-1, and 2-2) are present in the subblock #2 and a last significant coefficient 1011 of the subblock #1 is positioned as illustrated in FIG. 10(a).

When it is assumed that a significant coefficient is not present in the subblock #3, due to the coefficients of the subblock #2, information of the coefficients regarding the subblock #2 should be transmitted from the encoder to the decoder.

Here, the information of the coefficients may include last non-zero coefficient flag, coefficient level information (whether a coefficient is greater than 1 or 2, sign information, and the like), trailing 0 information, and the like.

In order to improve this, the positions of the significant coefficients of the subblock #2 may be re-positioned as illustrated in FIG. 10(b).

Referring to FIG. 10(b), the significant coefficients of the subblock #2 may be re-positioned next to the position of the last significant coefficient 1011 of the subblock #1 in a reverse scan order, i.e., in a reverse order of the scan order (i.e., before the position of the last significant coefficient according to the scan order.

That is, according to the reverse scan order, the sample 2-0, the same 2-1, and the sample 2-2 may be positioned in this order next to the position of the last significant coefficient 1011.

In this case, information indicating whether the subblock #2 includes one or more non-zero quantized transform coefficient levels may be transmitted from the encoder to the decoder. To this end, for example, cbf may be used, and when the cbf value is 1, it may indicate that a transform block includes one or more non-zero transform coefficient levels. When the cbf is used, the cbf may be transmitted from the encoder to the decoder by subblocks.

Here, the number of re-positioned coefficients may be predefined or determined by the encoder and signaled to the decoder. In the case of FIG. 10, the number of coefficients re-positioned in the subblock #1 may be predefined or determined by the encoder and signaled to the decoder.

The decoder may reconstruct (i.e., decode) coefficients on the basis of the number of predefined or re-positioned coefficients signaled from the encoder.

Figure 11:
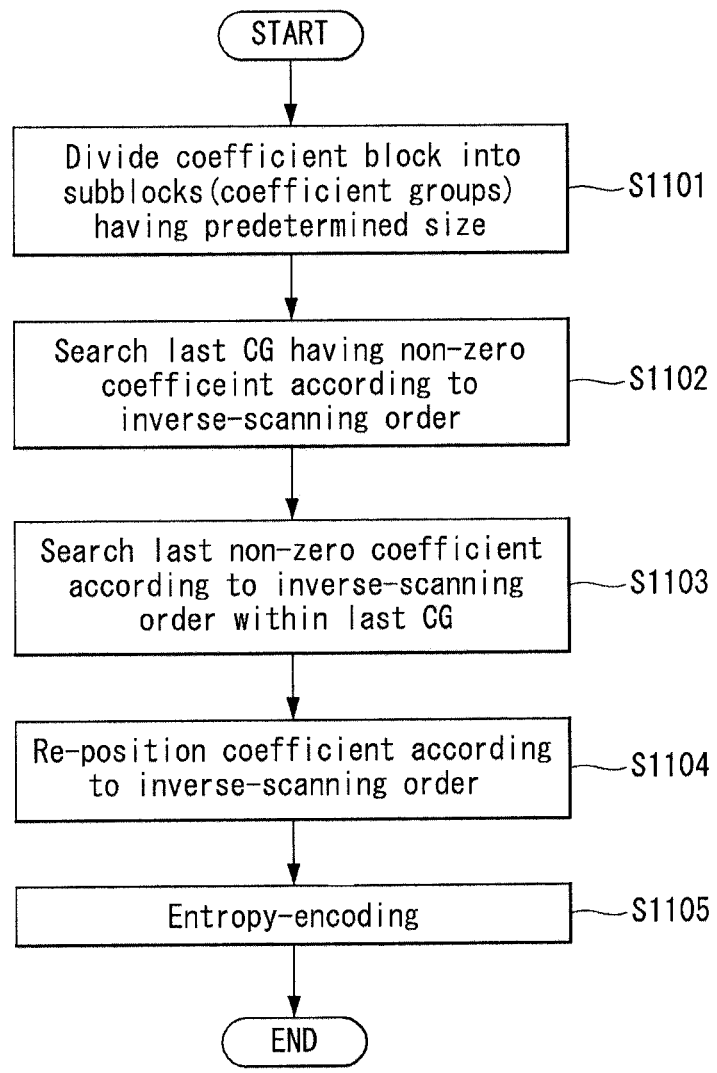
FIGS. 11 and 12 are views illustrating an encoding method according to an embodiment of the present invention.

FIG. 11 is a view illustrating an encoding method according to an embodiment of the present invention.

Referring to FIG. 11, the encoder divides a coefficient block (i.e., a block including quantized coefficients) into subblocks having a predetermined size (i.e., coefficient groups(CBs)) (S1101).

The encoder searches for a last CG (i.e., a first CG) including a non-zero coefficient according to a predetermined order (e.g., according to an inverse-scanning order) (S1102).

In the example of FIG. 10 above, the last CG is CG 2.

The encoder searches for a last non-zero coefficient according to a predetermined order (e.g., inverse-scanning order) within the last CG (i.e., first CG). (S1103).

In the example of FIG. 10 described above, non-zero coefficients are 2-0, 2-1, and 2-2.

The encoder re-positions the coefficients according to the inverse-scanning order.

The encoder may re-position the non-zero coefficients of the last CG (first CG) to a preceding CG (i.e., second CG) of the last CG according to the inverse-scanning order.

The encoder may search for a last non-zero coefficient according to a predetermined order (e.g., inverse-scanning order) within the preceding CG (i.e., second CG) of the last CG. Also, the encoder may re-position the non-zero coefficient of the second CG to a position next to a last non-zero coefficient of the second CG according to a predetermined order (e.g., inverse-scanning order).

A process of re-positioning a coefficient will be described in detail with reference to FIG. 12.

The encoder entropy-encodes re-positioned coefficients according to a predetermined order (e.g., a scanning order) (S1105).

Figure 12:
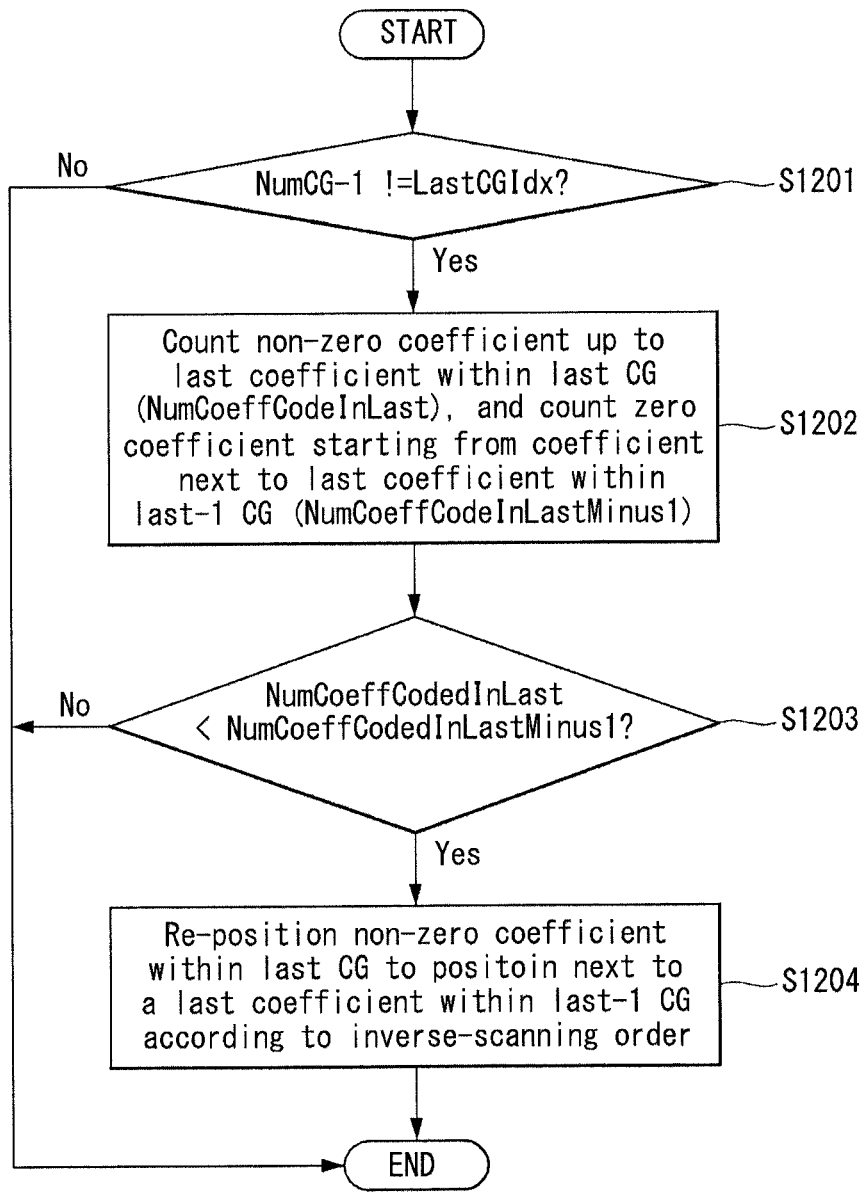

FIG. 12 is a view illustrating an encoding method according to an embodiment of the present invention.

FIG. 12 specifically illustrates a detailed method regarding step S1104 of FIG. 11 described above.

Referring to FIG. 12, the encoder determines whether total number of CGs within a coefficient block (NumCG)−1 is different from an index of a last CG (lastCGIdx) (i.e., index of first CG) (S1201).

Here, the lastCGIdx is an index of a last CG having a non-zero coefficient searched according to the inverse-scanning order (i.e., index of first CG). That is, it corresponds to '2' in the example of FIG. 10).

As described above, a CG index (i.e., a subblock index) may be given to each CG (i.e., each subblock) according to an inverse-scanning order.

That is, step S1201 refers to a step of determining whether a last CG is a last CG according to the inverse-scanning order within the corresponding coefficient block. That is, in the example of FIG. 10, it is determined whether the last CG index is '3' in the example of FIG. 10.

When NumCG−1 is the same as lastCGIdx according to a result determined in step S1201 (that is, when the last CG is a last CG according to the inverse-scanning order within the corresponding transform block), the encoder terminates the coefficient re-positioning process.

When NumCG−1 is different from lastCGIdx according to the result determined in step S1201 (that is, when the last CG is not a last CG according to the inverse-scanning order within the corresponding transform block), the encoder counts the number of non-zero coefficients to a last non-zero coefficient within the last CG, and counts the number of non-zero coefficients, starting from a coefficient next to the last non-zero coefficient within a CG preceding to the last CG (last-1 CG) (S1202).

NumCoeffCodeInLast indicates the number of non-zero coefficients counted up to the last coefficient within the last CG, and NumCoeffCodeInLastMinus1 indicates the number of zero coefficients counted, starting from a coefficient next to the last coefficient within the last-1 CG.

In the example of FIG. 10, NumCoeffCodeInLast is '3' (i.e., 2-0, 2-1, 2-2), and NumCoeffCodeInLastMinus1 is '7' (from a coefficient next to the last coefficient (1011)).

The encoder determines whether NumCoeffCodeInLast is smaller than NumCoeffCodeInLastMinus1 (S1203).

When NumCoeffCodeInLast is not smaller (or greater) than NumCoeffCodeInLastMinus1 according to a result determined in step S1203, the encoder terminates the re-positioning process.

When NumCoeffCodeInLast is smaller than NumCoeffCodeInLastMinus1 according to the result determined in step S1203, the encoder re-positions the non-zero coefficient within the last CG (i.e., first CG) searched in step S1103 to a position next to the last coefficient within the last-1 CG (i.e., second CG) (S1204).

That is, the encoder reads a non-zero coefficient within the last CG (i.e., first CG) according to the inverse-scanning order and re-positions it to a position next to the last coefficient within the last-1 CG (i.e., second CG) according to the inverse-scanning order.

In the example of FIG. 10 described above, the coefficients 2-0, 2-1, 2-2 next to the last coefficient 1011 within the last-1 CG (i.e., second CG) in order of 2-0, 2-1, 2-2 within the last CG (i.e., first CG).

Figure 13:
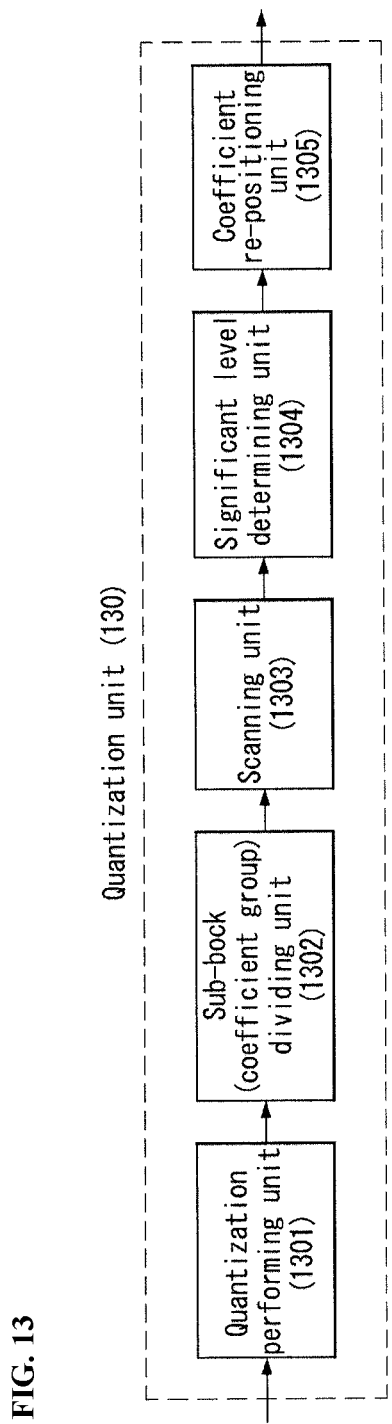
FIG. 13 is a block diagram of a quantization unit according to an embodiment of the present invention.

FIG. 13 is a block diagram of a quantization unit according to an embodiment of the present invention.

Referring to FIG. 13, the quantization unit 130 may be included in the encoder 100 illustrated in FIG. 1 and implement the function/process and/or method proposed in FIGS. 7 to 12.

In detail, the quantization unit 130 may include a quantization performing unit 1301, a sub-block (CG) dividing unit 1302, a scanning unit 1303, a significant level determining unit 1304, and a coefficient re-positioning unit 1305. The components of the quantization unit 130 illustrated in FIG. 13 are merely illustrative and some of the components of the quantization unit 130 may be included in other components so as to be implemented or any other component which is not illustrated may be added to be implemented together.

The quantization performing unit 1301 quantizes a transform coefficient. As a quantization method, a known technique may be used and a detailed description thereof will be omitted.

The subblock (CG) dividing unit 1302 divides a coefficient block (i.e., transform block) into subblocks (i.e., CGs) having a predetermined size. For example, the subblock (CG) dividing unit 1302 may divide a coefficient block into subblocks (i.e., CGs) having a 4×4 size.

The scanning unit 1303 scans quantized transform coefficients according to a predetermined order. That is, the scanning unit 1303 may transmit a quantized transform coefficient as an input value of the significant level determining unit 1304 according to a predetermined order.

The significant level determining unit 1304 determines a quantized transform coefficient level of a coefficient scanned by the scanning unit 1303.

Also, the significant level determining unit 1304 may identify a last non-zero coefficient and a last non-zero subblock (CG) including a last non-zero coefficient according to an inverse-scanning order.

Meanwhile, a method, a function, and the like, performed by the scanning unit 1303 and the significant level determining unit 1304 may also be performed in the scanning unit 1303, and in this case, the significant level determining unit 1304 may not be included in the quantization unit 130.

The coefficient re-positioning unit 1305 re-positions a transform coefficient. The coefficient re-positioning unit 1305 may re-position a coefficient as illustrated in the process of FIG. 12.

Figure 14:
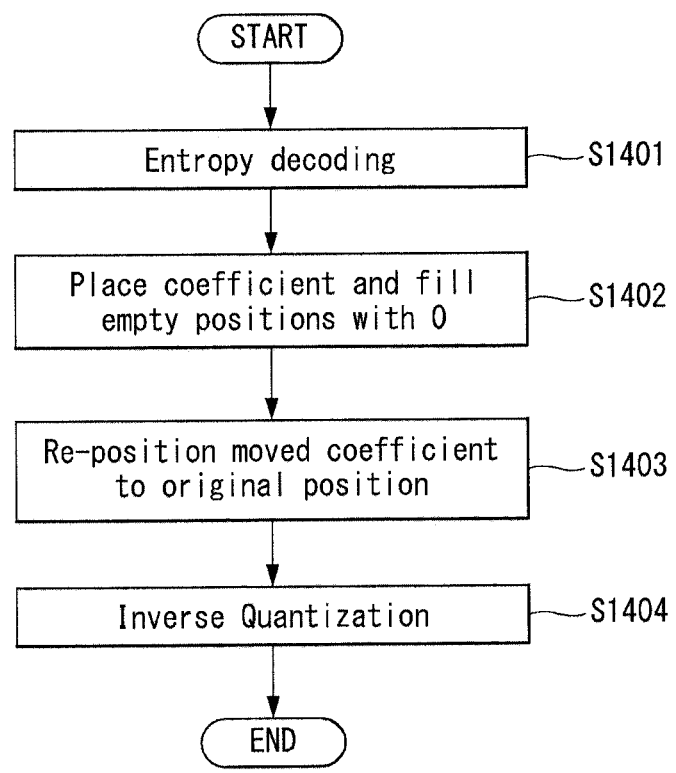
FIGS. 14 and 15 are views illustrating a decoding method according to an embodiment of the present invention.

FIG. 14 is a view illustrating a decoding method according to an embodiment of the present invention.

Referring to FIG. 14, the decoder entropy-decodes a signal (i.e., bit stream) output from the encoder (S1401).

That is, the decoder entropy-decodes a signal output from the encoder to obtain a quantized transform coefficient.

The decoder positions the quantized transform coefficient according to a predetermined order (e.g., scan order) and fills an empty position with 0 (S1402).

In the example of FIG. 10 described above, the coefficients before the last coefficient 1021 are filled with 0 according to the scan order, and the quantized transform coefficients are positioned, starting from the last coefficient 1021.

The decoder re-positions the transform coefficients moved (re-positioned) by the encoder to their original positions (S1403).

That is, the decoder re-positions the transform coefficients moved (re-positioned) from the first CG to the second CG by the encoder within the blocks of the quantized transform coefficients.

The coefficients 2-0, 2-1, and 2-2 moved by the encoder in the example of FIG. 10 described above are returned to the original positions, i.e., re-positioned to the subblock #2.

The decoder de-quantizes the quantized transform coefficients according to the predetermined order (e.g., the scan order) (S1404).

That is, the decoder may obtain the transform coefficients by inverse-quantizing the quantized transform coefficients.

Figure 15:
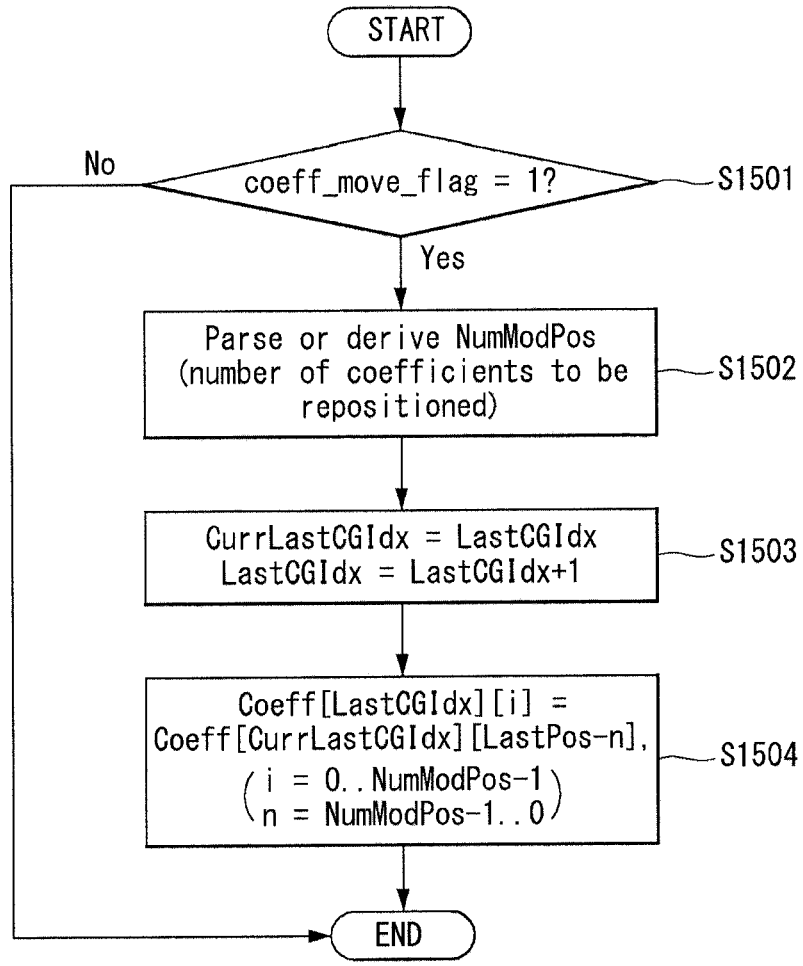

FIG. 15 is a view illustrating a decoding method according to an embodiment of the present invention.

FIG. 15 illustrates a specific method regarding step S1403 of FIG. 14.

Referring to FIG. 15, the decoder determines whether positions of the quantized transform coefficients have been moved (that is, whether the quantized transform coefficients have been re-positioned) (S1501).

Whether the positions of the quantized transform coefficients have been moved may be determined by blocks (e.g., transform blocks, coding blocks, etc.) slices, pictures, and the like.

For example, as illustrated in FIG. 15, a flag, coeff_move_flag, indicating whether positions of the quantized transform coefficients have been moved may be defined. The coeff_move_flag may be defined in a sequence parameter set (SPS), a picture parameter set (PPS), a slice header, and the like, and signaled from the encoder.

Or, information such as coeff_move_flag may not be signaled from the encoder, and when a predetermined condition is satisfied in the decoder, it may be determined that the positions of the quantized transform coefficients have been moved.

When the positions of the quantized transform coefficients have not been moved according to a result determined in step S1501, the process of re-positioning the transform coefficient to the original position is terminated.

However, when the positions of the quantized transform coefficients have been moved according to the result determined in step S1501, the decoder derives or parses the number (NumModPos) of the quantized transform coefficients which have been re-positioned (or moved by the encoder) (S1502).

Here, NumModPos may be defined in the SPS, the PPS, the slice header, and the like, and signaled from the encoder.

Meanwhile, the number of the quantized transform coefficients to be re-positioned (or moved by the encoder) may be previously defined and known by both the encoder and the decoder, and in this case, step S1502 may be skipped.

The decoder sets a current last CG index (CurrLastCGIdx) as a last CG index and sets a last CG index (LastCGIdx, B) as a last CG index (LastCGIdx, A)+1 (S1503).

That is, after the transform coefficients are re-positioned by the encoder, the decoder scans a position of the last CG (i.e., LastCGIdx(A) or lastSubBlkPos) and a position of the last coefficient (i.e., LastPos or lastSigPos). Here, an index of the last CG searched by the decoder corresponds to lastCGIdx(A). Details of this process will be described hereinafter.

Since the current last CG index (CurrLastCGIdx) indicates an index of a CG including the last coefficient after the transform coefficients are re-positioned by the encoder (i.e., the index of the second CG), it is set as lastCGIdx(A) derived as described above.

Also, since the last CG index (LastCGIdx, B) should indicate an index of an actual last CG (i.e., the index of the first CG) before the transform coefficients are re-positioned by the encoder, it is set as LastCGIdx(A)+1.

In the case of FIG. 10, CurrLastCGIdx is set to 1 and LastCGIdx(B) is set to 2.

The decoder sequentially positions (i.e., 'Coeff[LastCGIdx][i]') transform coefficients (i.e., 'Coeff[CurrLastCGIdx][LastPos–n]'), starting from a coefficient positioned in a position preceding by NumModPos–1 from the last coefficient to a last coefficient according to an inverse-scanning order within the CG (i.e., second CG) having CurrLastCGIdx, from a first coefficient position according to the inverse-scanning order within the CG (i.e., first CG) having LastCGIdx(B) (S1504).

This may be expressed by Equation 1 as follows.

$$\text{Coeff[LastCGIdx]}[i] = \text{Coeff[CurrLastCGIdx][LastPos}-n] (i=0,\ldots,\text{NumModPos}-1, n=\text{NumModPos}-1,\ldots,0). \quad \text{[Equation 1]}$$

In Equation 1, LastPos indicates a position of the last coefficient after the transform coefficients are re-positioned by the encoder.

Figure 16:
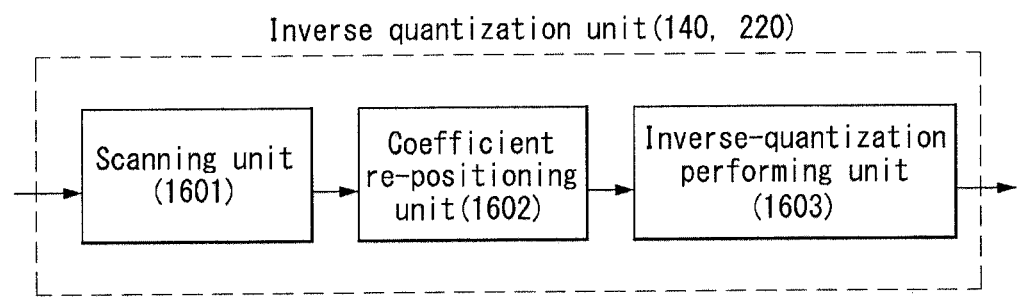
FIG. 16 illustrates an inverse-quantization unit according to an embodiment of the present invention.

FIG. 16 illustrates an inverse-quantization unit according to an embodiment of the present invention.

In FIG. 16, the inverse-quantization unit 140 (referring to FIG. 1) or 220 (referring to FIG. 2) is illustrates as a single block for the purposes of description, but the inverse-quantization unit 140 or 220 may also be implemented as a component included in the encoder and/or the decoder.

Referring to FIG. 16, the inverse-quantization unit 140 or 220 implements the function, process, and/or method proposed in FIGS. 7 to 10 and FIGS. 14 and 15 described above and performs a scaling and transform process as described hereinafter.

In detail, the inverse-quantization unit 140 or 220 may include a scanning unit 1601, a coefficient re-positioning unit 1602, and an inverse-quantization performing unit 1603. The components of the inverse-quantization unit 140 or 220 illustrated in FIG. 16 are merely illustrative and some of the components of the inverse-quantization unit 140 or 220 may be included in other components so as to be implemented or any other component which is not illustrated may be added to be implemented together.

The scanning unit 1603 positions a transform coefficient, which has been quantized according to a predetermined order, according to a predetermined order (e.g., scan order), and fills an empty position with 0.

The coefficient re-positioning unit 1602 re-positions the transform coefficient moved (re-positioned) by the encoder to its original position. The coefficient re-positioning unit 1602 may re-position the coefficient as in the process of FIG. 15 described above.

The inverse-quantization performing unit 1603 inverse-quantizes the quantized coefficient to obtain a transform coefficient. As an inverse-quantization method, a known technique may be used and details thereof will be omitted.

Hereinafter, a scaling and transform process according to an embodiment of the present invention will be described. In an embodiment described hereinafter, it is assumed that a transform block is divided into subblocks having a 4×4 size, but the present invention is not limited thereto and the transform block may also be divided into a predetermined size different from the 4×4 size.

Before describing the scaling and transform process, an up-right diagonal scan order array initialization process will be described.

An input of this process is a block size (blkSize).

An output of this process is an array diagScan[sPos][sComp]. An array index sPos is a scan position and has a range of value from 0 to (blkSize*blkSize)–1. Also, when the array index sComp value is 0, it specifies a horizontal component, and when the array index sComp value is 1, it specifies a vertical component.

An array diagScan is derived as illustrated in Table 1 below according to a block size (blkSize).

TABLE 1

```
i = 0
x = 0
y = 0
stopLoop = FALSE
while( !stopLoop ) {
    while( y >= 0 ) {
        if( x < blkSize && y < blkSize ) {
            diagScan[ i ][ 0 ] = x
            diagScan[ i ][ 1 ] = y
            i++
        }
        y- -
        x++
    }
    y = x
    x = 0
    if( i >= blkSize * blkSize )
        stopLoop = TRUE
}
```

In table 1, as for while( ) { }, when a condition within ( ) is met (i.e., in case of true), an operation { } is repeatedly performed. x++ means that x=x+1, and x-- means that x=x–1.

Figure 17:
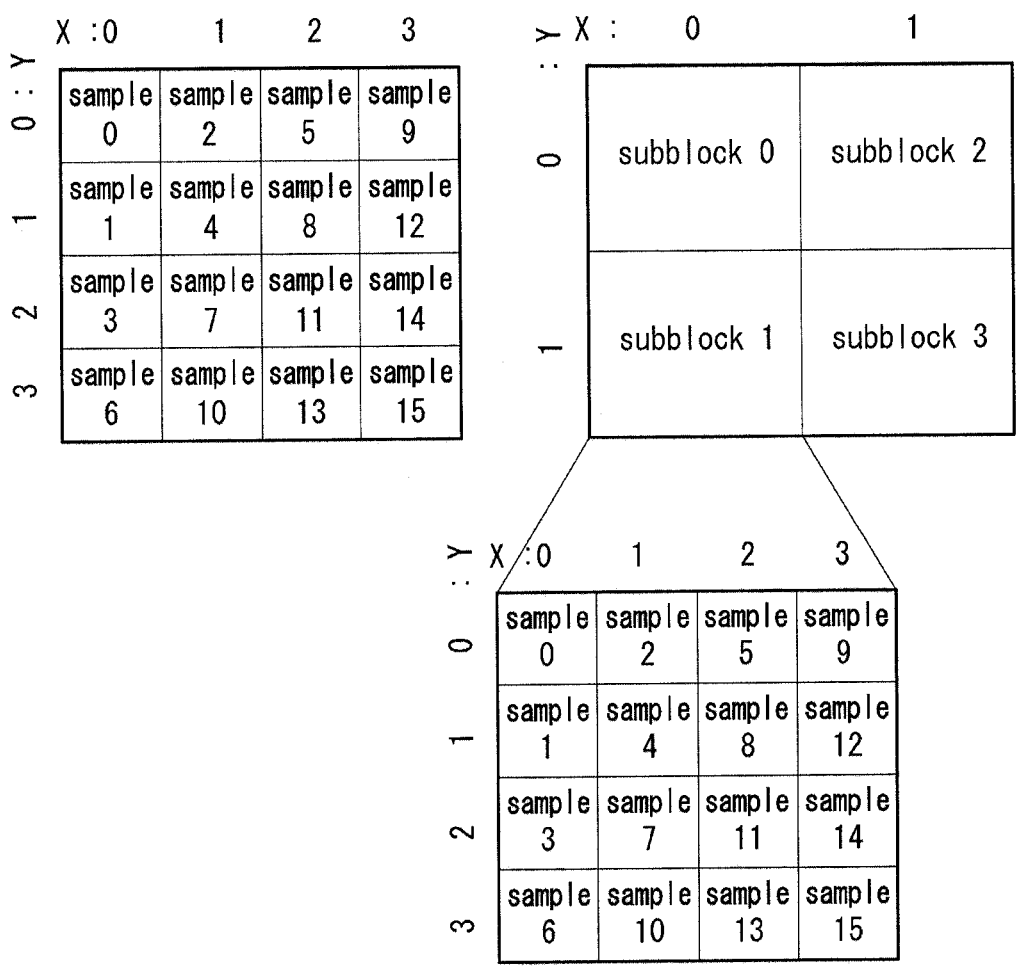
FIG. 17 is a view illustrating an up-right diagonal scan order array initialization process according to an embodiment to which the present invention may be applied.

FIG. 17 is a view illustrating an up-right diagonal scan order array initialization process according to an embodiment to which the present invention may be applied.

FIG. 17 illustrates a transform block having a 4×4 size and FIG. 17 illustrates a case in which a transform block having a 8×8 size is divided into 4×4 subblocks.

Referring to FIG. 17, since it is a transform block having a 4×4 size, a block size (BlkSize) in Table 1 is set to 4 and a value of an array (diagScan) regarding each sample may be set as follows.

Sample #0: diagScan[0][0]=0/diagScan[0][1]=0→(0,0)
Sample #1: diagScan[1][0]=0/diagScan[1][1]=1→(0,1)
Sample #2: diagScan[2][0]=1/diagScan[2][1]=0→(1,0)
Sample #3: diagScan[3][0]=0/diagScan[3][1]=2→(0,2)
Sample #4: diagScan[4][0]=1/diagScan[4][1]=1→(1,1)
Sample #5: diagScan[5][0]=2/diagScan[5][1]=0→(2,0)
. . .
Sample #15: diagScan[15][0]=3/diagScan[15][1]=3→(3,3)

Referring to FIG. 17, since the transform block having a 8×8 size is divided into subblocks having a 4×4 size, a block size (blkSize) may be set to 2 and an array diagScan regarding each subblock may be set as follows.

Subblock #0: diagScan[0][0]=0/diagScan[0][1]=0→(0,0)
Subblock #1: diagScan[1][0]=0/diagScan[1][1]=1→(0,1)
Subblock #2: diagScan[2][0]=1/diagScan[2][1]=0→(1,0)
Subblock #3: diagScan[3][0]=0/diagScan[3][1]=2→(0,2)

Also, regarding each subblock, the value of the array diagScan regarding each sample may be set as illustrated in FIG. 17.

For the scaling and transform process, at least one of the followings may be input.

A position (e.g., (xTbY, yTbY)) for specifying a (luma or chroma) top-left sample of a relatively current transform block in a (luma or chroma) top-left sample of a current picture A variable (e.g., trafoDepth) for specifying a hierarchy depth of a relatively current block in a coding block A variable (e.g., cIdx) for specifying a color component of a current block A variable (e.g., nTbS) for specifying a size of a current transform block Through this process, an array of residual samples having a size (i.e., (nTbS)×(nTbS)) of a transform block may be output. Hereinafter, the array of residual samples will be referred to as r[x][y].

A quantization parameter (qP) may be determined to be different according to variables (e.g., cIdx) for specifying a color component of a current block.

For example, the quantization parameter (qP) may be derived as follows.

In the case (cIdx=0) of a luma component (Y), the quantization parameter (qP) may be determined as a luma quantization parameter (Q_p'Y) (qP=Q_p'Y). In the case of chroma component (Cb) (cIdx=1), the quantization parameter (qP) may be determined as a luma quantization parameter (Q_p'Cb) (qP=Q_p'Cb). In the case of chroma component (Cr) (cIdx=2), the quantization parameter (qP) may be determined as a luma quantization parameter (Q_p'Cr) (qP=Q_p'Cr).

The (nTbS)×(nTbS) array of residual samples may be derived as follows.

If a position of a quantized transform coefficient is moved (that is, when re-positioning of a coefficient according to the present invention is applied), each step may be applied in the following order.

For example, coeff_move_flag may indicate whether a position of a quantized transform coefficient has been moved (that is, whether re-positioning of a quantized transform coefficient according to the present invention is applied). When coeff_move_flag is 1, it may indicate that the position of the coefficient has been moved, and when coeff_move_flag is 0, it may indicate that the position of the coefficient has not been moved.

When coeff_move_flag is 1, each step may be applied in the following order (If coeff_move_flag is equal to 1, the following ordered steps apply:

First step) The decoder may initialize a position of a last CG (i.e., subblock) by a CG number according to a transform block size.

This may be expressed by Equation 2 below.

lastSubBlock=(1<<(log2TrafoSize−2))*(1<<(log2TrafoSize−2))−1    [Equation 2]

In Equation 2, 'lastSubBlock' indicates a position of a last subblock (i.e., CG), and 'log2TrafoSize' indicates a value by taking log 2 in a size of a current transform block.

For example, in the case of a transform block having a 8×8 size as illustrated in FIG. 10, a position of a last subblock (lastSubBlock) may be initialized to the subblock #3 (i.e., 3). Similarly, in the case of a transform block having a 16×16 size, a position of a last subblock (lastSubBlock) may be initialized to a subblock #15 (i.e., 15).

Second step) The decoder scans a position of a last CG (i.e., subblock). That is, regarding a variable i(i=lastSubBlock, . . . , 0), the decoder may apply the following method in order to scan a position of a last CG (i.e., subblock) (For i with i=lastSubBlock, . . . , 0, the followings apply:).

2-1) A variable xS (Horizontal axis coordinates of last CG) may be set to be the same as ScanOrder[log2TrafoSize−2][scanIdx][i][0].

2-2) A variable yS (Vertical axis coordinates of last CG) may be set to be the same as ScanOrder[log2TrafoSize−2][scanIdx][i][1].

An array ScanOrder[log2BlockSize][scanIdx][sPos][sComp] may specify mapping of a scan position sPos and a horizontal component and a vertical component of a scan-order matrix. Here, log2BlockSize is equal to log2TrafoSize−2 and sPos is equal to i. As described above, i=lastSubBlock, . . . , 0.

Here, the array index 'scanIdx' may specify a scan order. For example, when scanIdx is 0, it may indicate an up-right diagonal scan order, when scanIdx is 1, it may indicate a horizontal scan order, and when scanIdx is 2, it may indicate a vertical scan order.

2-3) If a non-zero significant coefficient is present within a subblock, a position of a last subblock (lastSubBlkPos) (i.e., LastCGIdx or an index of the second CG) is set to i. Also, i is set to −1 (If coded_sub_block_flag[[xS][yS][cIdx] is equal to 1, lastSubBlkPos is set equal to i and i is set equal to −1). Here, [xS][yS] specifies a position of a subblock within a transform block.

Here, the coded_sub_block_flag may indicate whether a non-zero significant coefficient is present within a subblock of a (xS, yS) position within a transform block. The coded_sub_block_flag may be signaled from the encoder to the decoder. When the coded_sub_block_flag is 1, it may indicate that a non-zero significant coefficient is present within a subblock of (xS, yS) position, and when coded_sub_block_ flag is 0, it may indicate that a non-zero significant coefficient is not present within the subblock of the (xS, yS) position.

That is, the decoder may scan a position (lastSubBlkPos) of a last subblock (i.e., LastCGIdx or index of the second CG), while sequentially reducing the value of 1 from lastSubBlock to 0.

Here, when a subblock in which the non-zero significant coefficient is present is scanned (that is, when a subblock in which the coded_sub_block_flag is 1 is scanned), the decoder may set a position of the last subblock (lastSubBlkPos) to 1 and terminates the second step.

For example, in case where the up-right diagonal scan order is applied in the example of FIG. 10 described above (i.e., in the case of lastSubBlock=3, log2TrafoSize=3, scanIdx=0), a position of the last subblock may be scanned as follows.

In the case of FIG. 10, since a last significant coefficient 1021 is positioned in the subblock #1, a coded_sub_block_flag value regarding the subblock #0 and the subblock #1 may be signaled as 1 and a coded_sub_block_flag value regarding the subblock #2 and the subblock #3 may be signaled as 0.

First, when i=3(=lastSubBlock), the decoder sets xS=1 (=ScanOrder[1][0][3][0]) and yS=1(=ScanOrder[1][0][3][1]). Since the coded_sub_block_flag value regarding the subblock E3 is 0, the decoder reduces i by 1.

Also, when i=2, the decoder sets xS=1(=ScanOrder[1][0][2][0]) and yS=0(=ScanOrder[1][0][2][1]). Since the coded_sub_block_flag regarding the subblock #2 is 0, the decoder reduces i by 1.

Also, when i=1, the decoder sets xS=0(=ScanOrder[1][0][11][0]) and yS=1(=ScanOrder[1][0][1][1]). Since the coded_sub_block_flag value regarding the subblock #1 is 1, the decoder may set a position of the last subblock (lastSubBlkPos) to i(=1), and the second step may be terminated.

Third step) The decoder scans a position of a last coefficient. That is, regarding a variable n (n=12, . . . , 0), in order to scan a position of a last coefficient, the decoder may apply the following method (For n with n=15, . . . , 0, the following ordered steps apply).

3-1) A variable xC (horizontal axis coordinates of the last coefficient) may be set to be equal to (xS<<2)+ScanOrder[2][scanIdx][n][0].

3-2) A variable yC (vertical axis coordinates of the last coefficient) may be set to be equal to (yS<<2)+ScanOrder[2][scanIdx][n][1].

That is, the variable xC and the variable yC may indicate a position of a transform coefficient within a last subblock (last CG) (i.e., lastSubBlkPos or second CG) determined in the second step above.

An array ScanOrder[log2BlockSize][scanIdx][sPos][sComp] may specify a scan position sPos and a horizontal component and a vertical component of a scan-order matrix. Here, the log2BlockSize is equal to 2, and sPos is equal to n. As described above, n=15, . . . , 0.

Also, as described above, the array index 'scanIdx' may specify a scan order. For example, when scanIdx is 0, it may indicate the up-right diagonal scan order, when scanIdx is 1, it may indicate a horizontal scan order, and when scanIdx is 2, it may indicate a vertical scan order.

3-3) If the transform coefficient level is not 0, a position of the last significant coefficient (lastSigPos) (i.e., LastPos) is set to n. Also, n is set to n−1 (If sig_coeff_flag[xC][yC][cIdx] is equal to 1, lastSigPos is set to n, and n is set equal to −1). Here, [xC][yC] specifies a position of a transform coefficient with a transform block.

Here, sig_coeff_flag may indicate whether a transform coefficient level in a (xC, yC) position is 0. The sig_coeff_flag may be signaled from the encoder to the decoder. When the sig_coeff_flag is 1, it may indicate the transform coefficient level in the (xC, yC) position is not 0, and when the sig_coeff_flag is 0, it may indicate that the transform coefficient level in the (xC, yC) position is 0.

That is, the decoder may scan a position of a last significant coefficient (lastSigPos) (i.e., lastPos), while sequentially reducing the value of n from 15 to 0 within the subblock.

Here, when the decoder finds a non-zero significant coefficient within the last CG (i.e., second CG) (i.e., when the decoder finds a transform coefficient whose sig_coeff_flag is 1), the decoder may set a position of the last significant coefficient (lastSigPos or lastPos) to n and terminate the third step.

For example, when the up-right diagonal scan order is applied in the example of FIG. 10 (i.e., in the case of scanIdx=0), a position of the last subblock may be scanned as follows.

In the case of FIG. 10, since a last significant coefficient 1021 is $12^{th}$ coefficient according to the inverse-scanning order of the subblock #1, the sig_coeff_flag may be signaled as 1 from a coefficient #0 to a coefficient #11, and the sig_coeff_flag value may be signaled as 0 from a coefficient #12 to a coefficient #15.

For the purposes of description, it will be described on the assumption of coordinates within the last CG. That is, when i=15, the decoder sets xC=3(=ScanOrder[2][0][15][0]) and yS=3(=ScanOrder[2][0][15][1]). Since the sig_coeff_flag value regarding the coefficient #15 is 0, the decoder reduces i by 1.

Also, when i=14, the decoder sets xC=3(=ScanOrder[2][0][14][0]), yS=2(=ScanOrder[2][0][14][1]). Since the sig_coeff_flag value regarding the coefficient #14 is 0, the decoder reduces i by 1.

Also, when i=13, the decoder sets xC=2(=ScanOrder[2][0][13][0]), yS=3(=ScanOrder[2][0][13][1]). Since the sig_coeff_flag value regarding the coefficient #13 is 0, the decoder reduces i by 1.

Also, when i=12, the decoder sets xC=3(=ScanOrder[2][0][12][0]), yS=1(=ScanOrder[2][0][12][1]). Since the sig_coeff_flag value regarding the coefficient #12 is 0, the decoder reduces i by 1.

Also, when i=11, the decodes sets xC=2(=ScanOrder[2][0][11][0]), yS=2(=ScanOrder[2][0][11][1]). Since the sig_coeff_flag regarding the coefficient #11 is 1, the decoder may set a position of the last significant coefficient (lastSigPos) to i (=11), and the third step may be terminated.

Fourth step) The decoder scans a starting position of a coefficient to be moved within the last CG (i.e., subblock).

4-1) A variable xModC (horizontal coordinates of a starting position of a coefficient to be moved) may be set to be equal to (xS<<2)+ScanOrder[2][scanIdx][lastSigPos−NumModPos+1][0].

A variable yModC (vertical coordinates of a starting position of a coefficient to be moved) may be set to be equal to (yS<<2)+ScanOrder[2][scanIdx][lastSigPos−NumModPos+1][1].

Here, NumModPos indicates the number of transform coefficients to be moved.

That is, the coefficient to be moved within the last CG (i.e., subblock) is determined as a coefficient positioned before NumModPos−1 from a position of a last coefficient in an inverse-scan direction.

For the purposes of description, when coordinates within the last CG are assumed, in the case of FIG. 10, since NumModPos is 3 and lastSigPos in the foregoing third step is 11, the decoder sets xModC=3(=ScanOrder[2][0][9][0]), yModC=0(=ScanOrder[2][0][9][1]). That is, the coefficient #9 is determined.

Fifth step) The decoder scans coordinates of the last CG (i.e., first CG) before re-positioning of transform coefficients is performed by the encoder.

5-1) A variable xNewS (horizontal coordinates of last CG before re-positioning of the transform coefficients is performed) may be set to be equal to ScanOrder[log2TrafoSize−2][scanIdx][lastSubBlkPos+1][0].

5-2) A variable yNewS (vertical coordinates of last CG before re-positioning of the transform coefficients is performed) may be set to be equal to ScanOrder[log2TrafoSize−2][scanIdx][lastSubBlkPos+][11].

That is, the last CG (i.e., first CG) before re-positioning of the transform coefficients is performed by the encoder is determined as a CG positioned next to one from the last CG in the reverse-scan direction.

In the case of FIG. 10, since lastSubBlkPos is 1 in the foregoing second step, the decoder sets xNewS=1(=ScanOrder[1][0][2][0]), yNewS=0(=ScanOrder[1][0][2][11]). That is, the subblock (CG) #2 is determined.

Sixth step) The decoder re-positions the number of coefficients to be moved to a last CG (i.e., first CG) before performing positioning of coefficients by the encoder derived in the fifth step from the last CG (i.e., second CG) after performing positioning of the coefficients by the encoder derived in the second step.

That is, in order to re-position the coefficients regarding a variable x (x=0, . . . , NumModPos), the decoder may apply the following method (For x being 0, . . . , NumModPos, the followings apply).

6-1) A variable xNewC (horizontal axis coordinates after coefficients to be re-positioned by the decoder are re-positioned) is set to be equal to (xNewS<<2)+ScanOrder[2][scanIdx][x][0].

6-2) A variable yNewC (vertical axis coordinates after coefficients to be re-positioned by the decoder are re-positioned) is set to be equal to (yNewS<<2)+ScanOrder[2][scanIdx][x][1].

For the purposes of description, when coordinates within the last CG (first CG) before re-positioning by the encoder are assumed, in the case of FIG. 10, since NumModPos is 3, positions of coefficients to be re-positioned, after re-positioning, are determined as follows.

xNewS=0(=ScanOrder[2][0][0][0]), yNewC=-0(=ScanOrder[2][0][0][1])→(0, 0)

xNewS-=0(=ScanOrder[2][0][1][0]), yNewC=1(=ScanOrder[2][0][1][1])→(0, 1)

xNewS=1 (=ScanOrder[2][0][2][0]), yNewC=-0(=ScanOrder[2][0][2][11])→(1, 0)

6-3) Coefficient levels after re-positioning of coefficients to be re-positioned are set to coefficient levels of coefficients to be re-positioned.

TransCoeffLevel[xNewC][yNewC][cIdx] is set to be equal to TransCoeffLevel [xModC+x][yModC+x][cIdx]. Here, TransCoeffLevel indicates a transform coefficient level.

That is, after re-positioning of the coefficients to be re-positioned derived in the sixth step, the coefficient levels are set to coefficient levels of coefficients to be re-positioned derived in the fourth step.

In the case of FIG. 10, a coefficient level of a (0,0) position of the subblock #2 is set to a coefficient level of 2-0, a coefficient level of a (0,1) position of the subblock #2 is set to a coefficient level of 2-1, and a coefficient level of a (1,0) position of the subblock #2 is set to a coefficient level of 2-2.

The decoder may derive an array of residual samples r having a (nThs)×(nThS) size as follows.

When a cu_transquant_bypass_flag is 1, the decoder sets an array of the (nTbs)×(nTbS) size to be equal to TransCoeffLevel[xTbY][yTbY][cIdx] as an array of transform coefficients having the (nTbS)×(nTbS) size.

Here, the cu_transquant_bypass_flag specifies whether the scaling and transform process is performed, and, for example, when the value is 1, the scaling and transform process described above may not be performed.

TransCoeffLevel indicates an array specifying a coefficient level of each coefficient included in a transform block.

Meanwhile, in otherwise case, the following steps are sequentially applied.

1) The decoder may start a scaling process for a transform coefficient. Here, as input vales of the scaling process, a transform block position (xTbY, yTbY), a size nTbS of a transform block, a variable cIdx for specifying a color component, and a quantization parameter qP may be input, and an array of scaled transform coefficient d having a (nTbS)×(nTbS) size may be output.

2) An array of residual sample r having a (nTbS)×(nTbS) size may be derived as follows.

When transform_skip_flag[xTbY][yTbY][cIdx] is 1, the decoder may derive the residual sample array value r[x][y] (x=0, . . . , nTbS-1, y=, . . . , nTbS-1) as follows.

Here, transform_skip_flag may specify whether transform is applied to the corresponding transform block, and for example, when it is 1, it may indicate that transform has not been applied.

The residual sample array value r[x][y] may be set to be equal to (d[x][y]<<7). d[x][y] indicates a scaled transform coefficient array.

Meanwhile, in otherwise case (when transform_skip_flag[xTbY][yTbY][cIdx] is 0), the decoder may start the transform process for the scaled transform coefficient. Here, a transform block position (xTbY, yTbY), a size nTbS of a transform block, a variable cIdx for specifying a color component, and an array of scaled transform coefficient d having the size of (nTbS)×(nTbS) may be input as input values, and an array of residual sample r having a (nTbS)×(nTbS) size may be output.

3) The decoder may derive a variable bdShift as expressed by Equation 3 below.

$$bdShift=(cIdx==0)?20-BitDepthY:20-BitDepthC \quad \text{[Equation 3]}$$

In Equation 3, in x?y:z, when x is true or not 0, it is derived as a y value, or otherwise, it is derived as a z value.

In Equation 3, BitDepthY indicates a bit depth of a luma component, and BitDepthC indicates a bit depth of a chroma component.

4) A residual sample value r[x][y] (x=0, . . . , TbS-1, y=, . . . , nTbS-1) may be modified as expressed by Equation 4 below.

$$r[x][y]=(r[x][y]+(1<<(bdShift-1)))>>bdShif \quad \text{[Equation 4]}$$

The embodiments described so far are those of the elements and technical features being coupled in a predetermined form. So far as there is not any apparent mention, each of the elements and technical features should be considered to be selective. Each of the elements and technical features may be embodied without being coupled with other elements or technical features. In addition, it is also possible to construct the embodiments of the present invention by coupling a part of the elements and/or technical features. The order of operations described in the embodiments of the present invention may be changed. A part of elements or technical features in an embodiment may be included in another embodiment, or may be replaced by the elements and technical features that correspond to other embodiment. It is apparent to construct embodiment by combining claims that do not have explicit reference relation in the following claims, or to include the claims in a new claim set by an amendment after application.

The embodiments of the present invention may be implemented by various means, for example, hardware, firmware, software and the combination thereof. In the case of the hardware, an embodiment of the present invention may be implemented by one or more application specific integrated circuits (ASICs), digital signal processors (DSPs), digital signal processing devices (DSPDs), programmable logic devices (PLDs), field programmable gate arrays (FPGAs), a processor, a controller, a micro controller, a micro processor, and the like.

In the case of the implementation by the firmware or the software, an embodiment of the present invention may be implemented in a form such as a module, a procedure, a function, and so on that performs the functions or operations described so far. Software codes may be stored in the memory, and driven by the processor. The memory may be located interior or exterior to the processor, and may exchange data with the processor with various known means.

It will be understood to those skilled in the art that various modifications and variations can be made without departing from the essential features of the inventions. Therefore, the detailed description is not limited to the embodiments described above, but should be considered as examples. The scope of the present invention should be determined by reasonable interpretation of the attached claims, and all modification within the scope of equivalence should be included in the scope of the present invention.

INDUSTRIAL AVAILABILITY

So far, the preferred embodiments of the present invention described above are disclosed as examples, and may be modified, changed, substituted or added by other various embodiments within the inventive concept and scope of the present invention described in the enclosed claims below by those skilled person in the art.

The invention claimed is:

1. A method for encoding an image by an encoding device, the method comprising:
dividing a quantized coefficient block into coefficient groups having a predetermined size;
searching a first coefficient group which is a last coefficient group including a non-zero coefficient according to a predetermined inverse-scanning order within the quantized coefficient block;
searching a last non-zero coefficient according to the inverse-scanning order within a second coefficient group which is a preceding coefficient group of the first coefficient group according to the inverse-scanning order;
counting a number of non-zero coefficients within the first coefficient group and a number of zero coefficients at positions starting from the last non-zero coefficient within the second coefficient group;
when the number of non-zero coefficients within the first coefficient group is smaller than the number of zero coefficients at positions starting from the last non-zero coefficient within the second coefficient group, re-positioning the non-zero coefficient of the first coefficient group to a position next to the last non-zero coefficient within the second coefficient group; and
performing entropy-encoding by an encoder according to a predetermined scanning order.

2. A method for decoding an image by a decoding device, the method comprising:
deriving a quantized transform coefficient by entropy-decoding a bit stream output from an encoder;
parsing information related to a number of moved quantized transform coefficient which have been re-positioned by the encoder, from the bit stream;
positioning the quantized transform coefficient according to a predetermined scanning order within a quantized coefficient block divided into coefficient groups having a predetermined size;
searching a second coefficient group which is a last coefficient group including a last non-zero coefficient and a position of the last non-zero coefficient according to a predetermined inverse-scanning order within the quantized coefficient block;
re-positioning the moved quantized transform coefficient within the second coefficient group to a first coefficient group which is a next coefficient group of the second coefficient group according to the scanning order, wherein a coefficient positioned at a position preceding by the number −1 from the last coefficient to a position of the last coefficient according to the inverse-scanning order within the second coefficient group is re-positioned to the first coefficient group; and
inverse-quantizing the re-positioned quantized transform coefficient to derive a transform coefficient,
wherein the moved quantized transform coefficients are re-positioned by the encoder when the number of non-zero coefficients within the first coefficient group is smaller than the number of zero coefficients at positions starting from the last non-zero coefficient within the second coefficient group.

3. The method of claim 2, wherein
the moved quantized transform coefficient is sequentially re-positioned, starting from a first coefficient position of the first coefficient group according to the inverse-scanning order.

4. The method of claim 2, further comprising:
parsing information indicating whether a position of the quantized transform coefficient has been moved from the bit stream,
wherein when the information indicates that the position of the quantized transform coefficient has been moved, the position of the moved quantized transform coefficient is re-positioned to its original position.

5. An encoding device for encoding an image, the encoding device comprising:
a memory configured to store the image; and
a processor configured to:
divide a quantized coefficient block into coefficient groups having a predetermined size;
search a first coefficient group which is a last coefficient group including a non-zero coefficient according to a predetermined inverse-scanning order within the quantized coefficient block;
search a last non-zero coefficient according to the inverse-scanning order within a second coefficient group which is a preceding coefficient group of the first coefficient group according to the inverse-scanning order;
count a number of non-zero coefficients within the first coefficient group and a number of zero coefficients at positions starting from the last non-zero coefficient within the second coefficient group;
when the number of non-zero coefficients within the first coefficient group is smaller than the number of zero coefficients at positions starting from the last non-zero coefficient within the second coefficient group, re-position the non-zero coefficient of the first coefficient group to a position next to the last non-zero coefficient within the second coefficient group; and
perform entropy according to a predetermined scanning order.

6. A decoding device for decoding an image, the decoding device comprising:
a processor configured to:
derive a quantized transform coefficient by entropy-decoding a bit stream output from an encoder;
parse information related to a number of moved quantized transform coefficient which have been re-positioned by the encoder, from the bit stream;
position the quantized transform coefficient according to a predetermined scanning order within a quantized coefficient block divided into coefficient groups having a predetermined size;
search a second coefficient group which is a last coefficient group including a last non-zero coefficient and a position of the last non-zero coefficient according to a predetermined inverse-scanning order within the quantized coefficient block; and
re-position the moved quantized transform coefficient within the second coefficient block to a first coefficient group which is a next coefficient group of the second coefficient group according to the scanning order, wherein a coefficient positioned at a position preceding by the number −1 from the last coefficient to a position of the last coefficient according to the inverse-scanning order within the second coefficient group is re-positioned to the first coefficient group; and an inverse-quantization performing unit configured to derive a transform coefficient by inverse-quantizing the re-positioned quantized transform coefficient, wherein the moved quantized transform coefficients are re-positioned by the encoder when a number of non-zero coefficients within the first coefficient group is smaller than a number of zero coefficients at positions starting from the last non-zero coefficients within the second coefficient group.

* * * * *